(12) United States Patent
Nohara et al.

(10) Patent No.: US 12,305,013 B2
(45) Date of Patent: May 20, 2025

(54) POLYPROPYLENE-BASED RESIN EXPANDED BEADS AND METHOD FOR PRODUCING POLYPROPYLENE-BASED RESIN EXPANDED BEADS

(71) Applicant: JSP CORPORATION, Tokyo (JP)

(72) Inventors: Tokunobu Nohara, Tokyo (JP); Yasutaka Ode, Utsunomiya (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 18/278,657

(22) PCT Filed: Dec. 21, 2021

(86) PCT No.: PCT/JP2021/047426
§ 371 (c)(1),
(2) Date: Aug. 24, 2023

(87) PCT Pub. No.: WO2022/190565
PCT Pub. Date: Sep. 15, 2022

(65) Prior Publication Data
US 2024/0158593 A1    May 16, 2024

(30) Foreign Application Priority Data
Mar. 12, 2021    (JP) .................. 2021-040849

(51) Int. Cl.
*C08J 9/16* (2006.01)
*C08J 9/00* (2006.01)
(Continued)

(52) U.S. Cl.
CPC .............. *C08J 9/0028* (2013.01); *C08J 9/18* (2013.01); *C08J 9/224* (2013.01); *C08J 9/232* (2013.01);
(Continued)

(58) Field of Classification Search
CPC ... C08J 9/0028; C08J 9/18; C08J 9/224; C08J 9/232; C08J 2203/22; C08J 2323/14;
(Continued)

(56) References Cited

U.S. PATENT DOCUMENTS

| 2004/0171708 A1 | 9/2004 | Yoshizawa et al. |
| 2009/0169895 A1* | 7/2009 | Nohara .................. C08J 9/0061 428/407 |

(Continued)

FOREIGN PATENT DOCUMENTS

| CN | 116888201 A | 10/2023 |
| EP | 4 306 580 A1 | 1/2024 |

(Continued)

OTHER PUBLICATIONS

Mar. 1, 2022 International Search Report issued in International Patent Application No. PCT/JP2021/047426.

(Continued)

*Primary Examiner* — K. Boyle
(74) *Attorney, Agent, or Firm* — Oliff PLC

(57) ABSTRACT

A polypropylene-based resin expanded beads configured to include an NOR type hindered amine and has a surface on which a thermoplastic polymer layer is located, in which a blending ratio of the amine in the expanded beads is 0.03 wt % or more and 0.5 wt % or less, and a blending ratio of the amine in the thermoplastic polymer layer is less than the blending ratio of the amine in the expanded beads. Further, the method for producing the expanded beads includes a covering and foaming step, in which in the resin beads to be obtained in the covering step, a blending ratio of the amine in the resin beads is adjusted to be 0.03 wt % or more and 0.5 wt % or less, and a blending ratio of the amine in a thermoplastic polymer layer is adjusted to be lower than the blending ratio of the amine in the resin beads.

10 Claims, 4 Drawing Sheets

(51) Int. Cl.
*C08J 9/18* (2006.01)
*C08J 9/224* (2006.01)
*C08J 9/232* (2006.01)
*C08K 5/3492* (2006.01)

(52) U.S. Cl.
CPC ....... *C08K 5/34926* (2013.01); *C08J 2203/22* (2013.01); *C08J 2323/14* (2013.01)

(58) Field of Classification Search
CPC .............. C08J 2201/03; C08J 2201/034; C08J 2203/06; C08J 2323/16; C08J 2423/16; C08J 9/365; C08J 2323/12; C08K 5/34926; C08K 7/22; C08K 2201/013; C08K 5/3435

See application file for complete search history.

(56) References Cited

U.S. PATENT DOCUMENTS

| | | |
|---|---|---|
| 2012/0037837 A1 | 2/2012 | Itoi |
| 2014/0346411 A1 | 11/2014 | Miura et al. |
| 2015/0158990 A1 | 6/2015 | Takagi et al. |
| 2016/0137805 A1 | 5/2016 | Miura |
| 2016/0333161 A1 | 11/2016 | Ono et al. |
| 2017/0204240 A1 | 7/2017 | Van Ravestyn et al. |
| 2018/0022886 A1 | 1/2018 | Oikawa et al. |

FOREIGN PATENT DOCUMENTS

| | | | |
|---|---|---|---|
| JP | 2004-263033 A | | 9/2004 |
| JP | 2009-298892 A | | 12/2009 |
| JP | 2018162370 A | * | 10/2018 |
| KR | 10-2015-0068295 A | | 6/2015 |
| WO | 2010/119670 A1 | | 10/2010 |
| WO | 2013/094529 A1 | | 6/2013 |
| WO | 2014/203876 A1 | | 12/2014 |
| WO | 2015/107847 A1 | | 7/2015 |
| WO | 2016/052739 A1 | | 4/2016 |
| WO | 2016/111017 A1 | | 7/2016 |

OTHER PUBLICATIONS

Mar. 1, 2022 Written Opinion of the International Searching Authority issued in International Patent Application No. PCT/JP2021/047426.
Jun. 7, 2023 Office Action issued in Japanese Patent Application No. 2023-505119.
Jul. 5, 2023 Notice of Allowance issued in Japanese Patent Application No. 2023-505119.
Sep. 19, 2024 Office Action issued in Korean Patent Application No. 10-2023-7030036.
Jun. 27, 2024 Office Action issued in Chinese Patent Application No. 202180094948.6.
Dec. 4, 2024 Extended European Search Report issued in European Application No. 21930410.2.
Feb. 11, 2025 Written Opinion issued in Brazil Application No. BR112023016058-8.
Feb. 18, 2025 Official Notice in Brazil Application No. BR 112023016058-8.

* cited by examiner

[Fig.1]
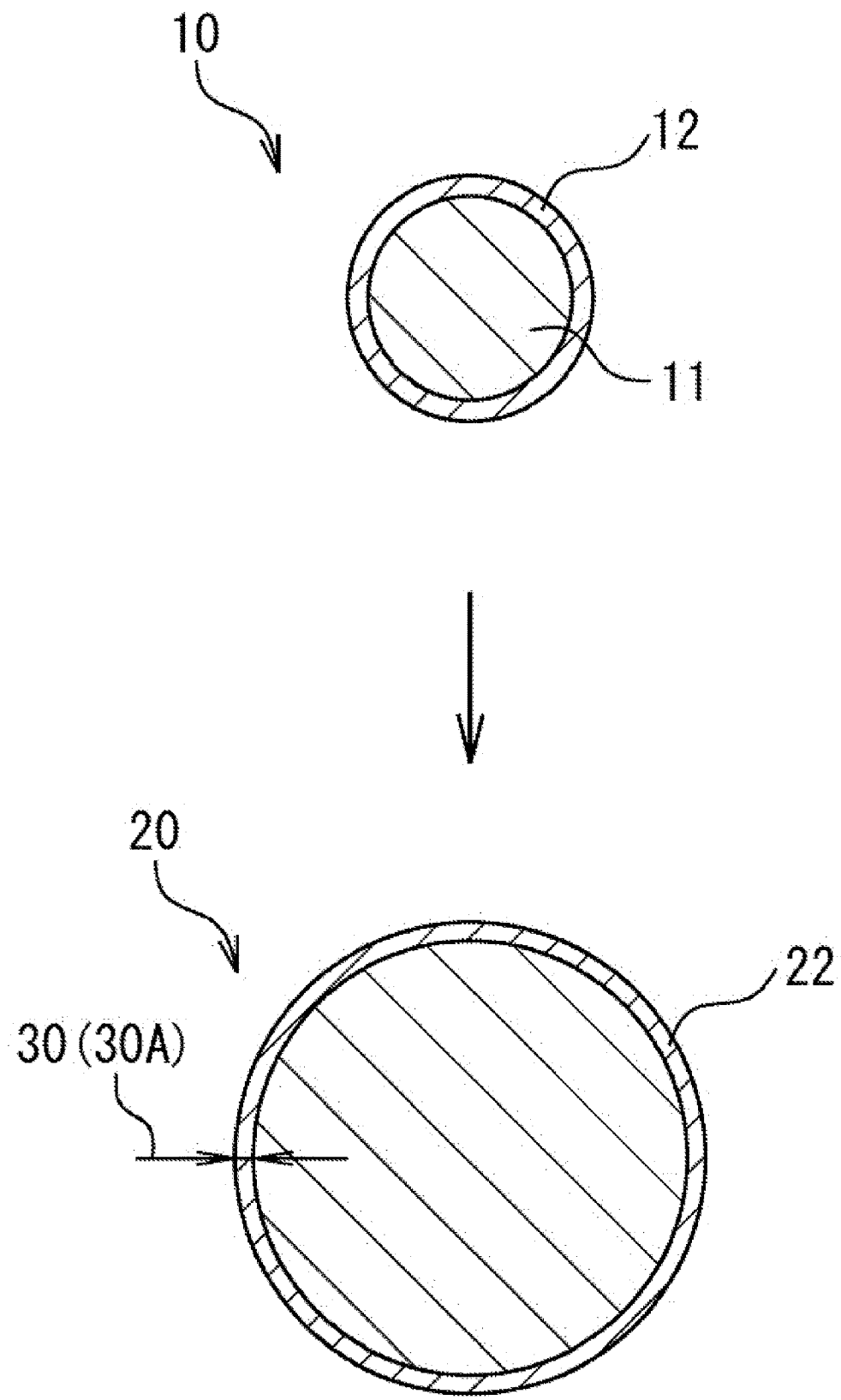

[Fig.2]
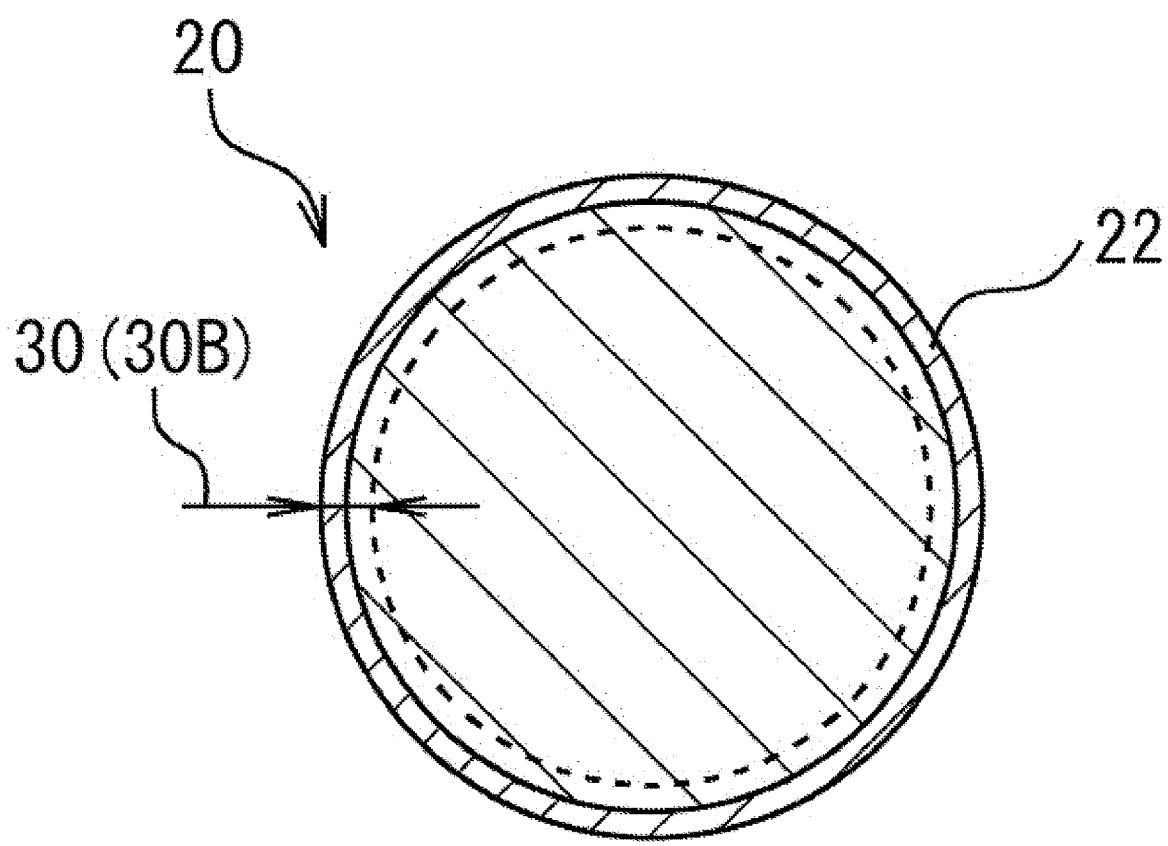

[Fig.3]
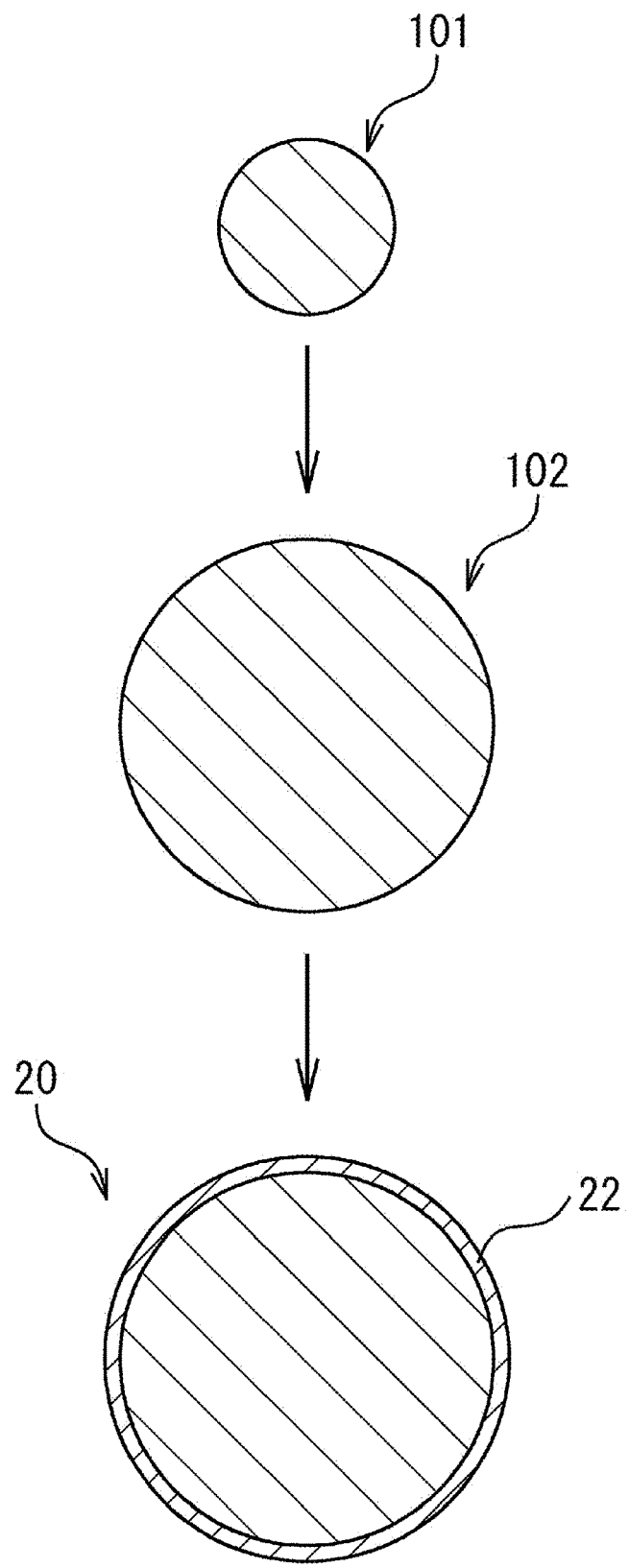

[Fig.4]
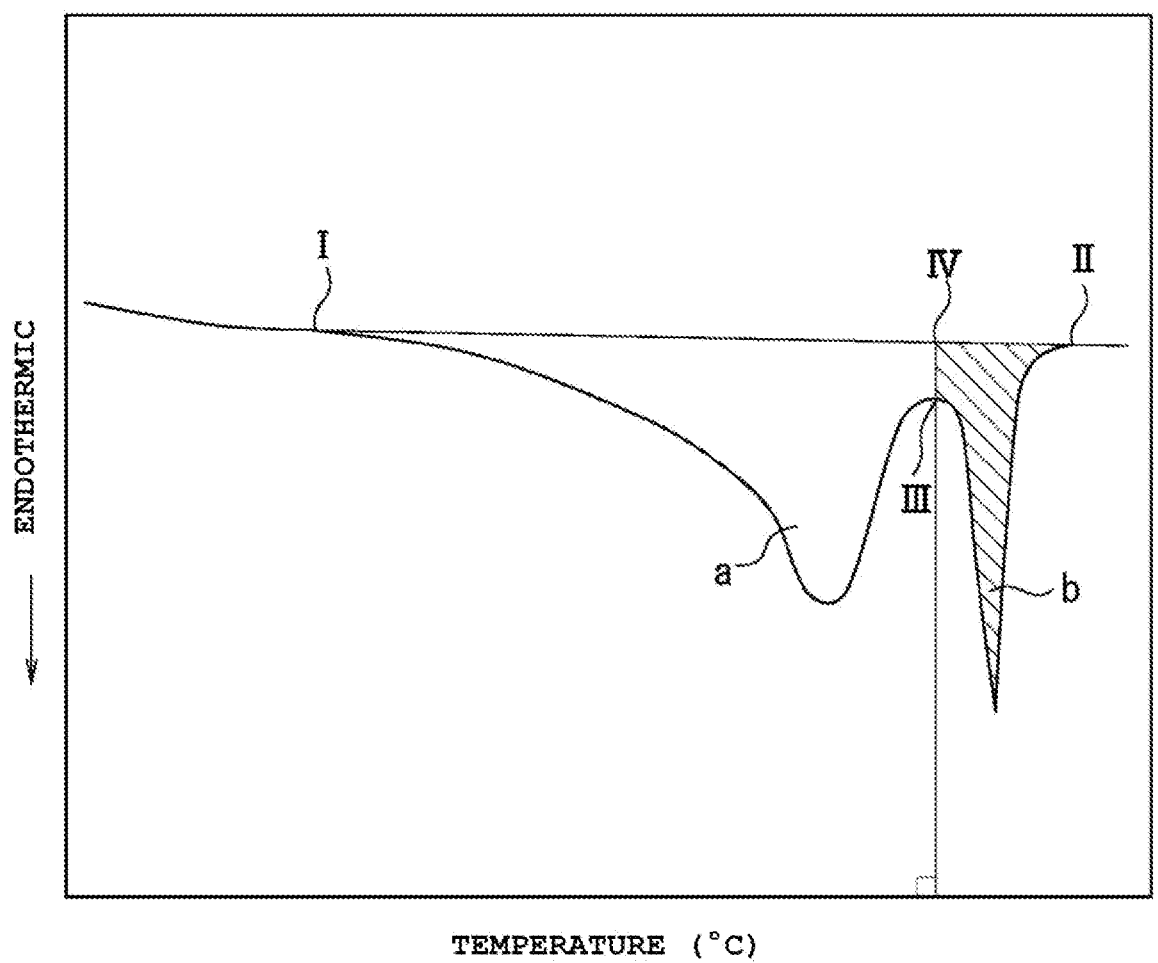

POLYPROPYLENE-BASED RESIN EXPANDED BEADS AND METHOD FOR PRODUCING POLYPROPYLENE-BASED RESIN EXPANDED BEADS

TECHNICAL FIELD

The present invention relates to polypropylene-based resin expanded beads and a method for producing the polypropylene-based resin expanded beads.

BACKGROUND ART

A molded article of polypropylene-based resin expanded beads obtained by in-mold molding of the polypropylene-based resin expanded beads is used for various applications such as packaging materials, automobile members, and building materials. The expanded beads constituting such expanded beads molded article are produced, for example, as follows.

First, the polypropylene-based resin beads are dispersed in an aqueous medium including an inorganic dispersant in a vessel. Next, the above polypropylene-based resin beads are impregnated with a blowing agent in the vessel. Next, the resin beads including the blowing agent (expandable (expandable resin beads) are released from the vessel together with the aqueous medium and foamed. In this way, the polypropylene-based resin expanded beads are produced.

The polypropylene-based resin expanded beads to be produced as described above may include a hindered amine-based flame retardant in order to enhance flame retardancy of the expanded beads molded article to be produced by using the polypropylene-based resin expanded beads (e.g., Patent Literature 1).

CITATION LIST

Patent Literature

Patent Literature 1: JP 2004-263033 A

SUMMARY OF INVENTION

Technical Problem

In order to exhibit desired flame retardancy, in a case where the hindered amine-based flame retardant is added to the polypropylene-based resin expanded beads as described above, there is room for improvement in the following points.

That is, in a case where the in-mold molding is performed by using the polypropylene-based resin expanded beads including the hindered amine-based flame retardant, fusion-bonding characteristics of the expanded beads to one another tend to decrease. Therefore, it may be difficult to obtain an expanded beads molded article having desired flame retardancy and excellent in fusion-bonding characteristics of the expanded beads to one another according to, for example, an expansion ratio of the expanded beads and in-mold molding conditions.

The present invention has been made in view of such background, and provides polypropylene-based resin expanded beads capable of providing an expanded beads molded article excellent in flame retardancy and also excellent in fusion-bonding characteristics of expanded beads to one another, and a method for producing the polypropylene-based resin expanded beads.

Solution to Problem

The polypropylene-based resin expanded beads of the present invention are polypropylene-based resin expanded beads including an NOR type hindered amine, wherein the polypropylene-based resin expanded beads have a surface on which a thermoplastic polymer layer is located, a blending ratio of the NOR type hindered amine in the polypropylene-based resin expanded beads is 0.03 wt % or more and 0.5 wt % or less, and a blending ratio of the NOR type hindered amine in the thermoplastic polymer layer is less than the blending ratio of the NOR type hindered amine in the polypropylene-based resin expanded beads (including 0).

Further, the method for producing polypropylene-based resin expanded beads of the present invention includes: a covering step of covering a core layer including a polypropylene-based resin as a base material resin and an NOR type hindered amine with a thermoplastic polymer layer; and a foaming step of foaming resin beads having the core layer and the thermoplastic polymer layer obtained by the covering step to obtain the polypropylene-based resin expanded beads, wherein in the resin beads, a blending ratio of the NOR type hindered amine in the resin beads is 0.03 wt % or more and 0.5 wt % or less, and a blending ratio of the NOR type hindered amine in the thermoplastic polymer layer is less than the blending ratio of the NOR type hindered amine in the resin beads (including 0).

Advantageous Effects of Invention

The polypropylene-based resin expanded beads of the present invention include the NOR type hindered amine in a predetermined range, and the blending ratio of the NOR type hindered amine in the thermoplastic polymer layer of the expanded beads is lower than the blending ratio of the NOR type hindered amine in the entire expanded beads. The polypropylene-based resin expanded beads of the present invention can provide an expanded beads molded article excellent in fusion-bonding characteristics of the expanded beads while maintaining good flame retardancy.

Further, according to the method for producing the polypropylene-based resin expanded beads of the present invention, it is possible to efficiently produce the polypropylene-based resin expanded beads also excellent in fusion-bonding characteristics of the expanded beads to one another during the in-mold molding while maintaining good flame retardancy.

BRIEF DESCRIPTION OF DRAWINGS

FIG. 1 is an explanatory view for explaining a part of a production method according to an embodiment of the production method of the present invention.

FIG. 2 is a cross-sectional view of a polypropylene-based resin expanded beads as an embodiment of the present invention.

FIG. 3 is an explanatory view for explaining a part of an another production method for producing polypropylene-based resin expanded beads of the present invention.

FIG. 4 is a DSC curve obtained according to a method for measuring transition heat of plastic described in JIS K7122:1987 for obtaining a total heat of fusion and a high-temperature peak heat of fusion of expanded beads in an example.

DESCRIPTION OF EMBODIMENTS

Hereinafter, the polypropylene-based resin expanded beads of the present invention and the method for producing polypropylene-based resin expanded beads of the present invention will be described in order. Note that the method for producing the polypropylene-based resin expanded beads of the present invention may be simply referred to as the production method of the present invention below. In the description of the present invention, FIGS. 1 to 3 are appropriately used.

FIG. 1 is an explanatory view for explaining a part of a production method according to an embodiment of the production method of the present invention. The upper part of FIG. 1 illustrates a cross section of a resin beads 10 used in in an embodiment of the production method of the present invention, and the lower part of FIG. 1 illustrates a cross section of a polypropylene-based resin expanded beads 20 of the present invention produced in an embodiment of the production method of the present invention. FIG. 2 is a cross-sectional view of the polypropylene-based resin expanded beads 20 as an embodiment of the present invention. FIG. 3 is an explanatory view for explaining a part of an another production method for producing the polypropylene-based resin expanded beads 20 of the present invention.

Note that the flame retardancy according to the present invention refers to a performance to be evaluated based on an FMVSS302 flammability test.

[Polypropylene-Based Resin Expanded Beads]

As illustrated in the lower part of FIG. 1, the polypropylene-based resin expanded beads 20 of the present invention have a surface on which a thermoplastic polymer layer 22 is located. Note that hereinafter, the polypropylene-based resin expanded beads 20 may be simply referred to as the expanded beads 20.

The expanded beads 20 includes an NOR type hindered amine. A blending ratio of the NOR type hindered amine included in the expanded beads 20 is 0.03 wt % or more and 0.5 wt % or less. By blending such sufficient amount of the NOR type hindered amine, the expanded beads 20 can exhibit good flame retardancy. Then, an expanded beads molded article molded by using the expanded beads 20 can exhibit good flame retardancy.

Further, the expanded beads 20 is configured such that a blending ratio of the NOR type hindered amine in the thermoplastic polymer layer 22 is lower than the blending ratio of the NOR type hindered amine in the expanded beads 20. Here, the blending ratio of the NOR type hindered amine in the thermoplastic polymer layer 22 being lower includes a case where the NOR type hindered amine is 0 wt % in the thermoplastic polymer layer 22. With such configuration, the present invention can provide expanded beads 20 capable of in-mold molding an expanded beads molded article excellent in fusion-bonding characteristics while maintaining good flame retardancy.

As described above, flame-retardant polypropylene-based resin expanded beads including the NOR type hindered amine as a flame retardant (which hereinafter is also simply referred to as a flame-retardant expanded beads) have been conventionally known. Such flame-retardant expanded beads is generally produced by melt-kneading a base material resin such as a polypropylene-based resin and the NOR type hindered amine to prepare a melt-kneaded product, granulating resin beads by using the melt-kneaded product, and foaming the resin beads. As for the conventional flame-retardant expanded beads produced in this way, the NOR type hindered amine is dispersed in the entire expanded beads. In other words, in the conventional flame-retardant expanded beads, the NOR type hindered amine to be blended in a surface layer of the expanded beads and the NOR type hindered amine to be blended in a center side of the expanded beads with respect to the surface layer is almost the same in blending ratio.

As for the conventional flame-retardant expanded beads including such NOR type hindered amine, fusion-bonding characteristics of the expanded beads to one another tend to decrease as compared with an expanded beads without the NOR type hindered amine. Further, it was found that such tendency was remarkable in a case where the base material resin constituting the expanded beads was a polypropylene-based resin having a high melting point or a case where a bulk density of the expanded beads was low. Although reasons for such tendency are not clear, it was presumed that fusion-bonding of the expanded beads to one another during the in-mold molding was inhibited since the NOR type hindered amine was present in a relatively large amount on the surface layer of the expanded beads. Therefore, an idea of controlling a blending ratio of the NOR type hindered amine in the surface layer of the expanded beads was arrived at. Then, by setting the blending ratio of the NOR type hindered amine in the surface layer of the expanded beads to be lower than the blending ratio of the NOR type hindered amine included in the entire expanded beads, an expanded beads molded article exhibiting good flame retardancy and excellent in fusion-bonding characteristics can be provided.

Hereinafter, the expanded beads 20 of the present invention will be described in more detail.

The expanded beads 20 have a surface on which a thermoplastic polymer layer 22 is located. Note that in the present description, as for the expanded beads 20, a portion excluding the thermoplastic polymer layer 22 to be described later may be referred to as an expanded beads body.

The expanded beads body is constituted of a base material resin including a polypropylene-based resin as a main component. In the present description, the main component of the base material resin refers to a component having a weight ratio of 50 wt % or more in the base material resin.

(Expanded Beads Body)

Base material resin constituting expanded beads body:

Examples of the polypropylene-based resin as the base material resin constituting the expanded beads body include a propylene homopolymer or a polypropylene-based copolymer having a structural unit to be derived from propylene in an amount of more than 50 wt %.

Examples of the above polypropylene homopolymer include polypropylene homopolymers such as isotactic polypropylene, syndiotactic polypropylene, and atactic polypropylene.

Further, examples of the above polypropylene-based copolymer include a copolymer of propylene and ethylene or α-olefin having four or more carbon atoms, such as a propylene-ethylene copolymer, a propylene-butene copolymer, and a propylene-ethylene-butene copolymer, a propylene-acrylic acid copolymer, and a propylene-maleic anhydride copolymer. Note that these copolymers may be any of a block copolymer, a random copolymer, and a graft copolymer. Further, the polymer described above may be crosslinked, but is preferably non-crosslinked.

The base material resin may include other resins and other polymers such as an elastomer in addition to the polypropylene-based resin without departing from the scope of the invention.

Examples of the other polymers include one or two or more of mixed materials selected from thermoplastic resins other than the polypropylene-based resins such as polyethylene-based resins, polystyrene-based resins, polyamide-based resins, and polyester-based resins, as well as elastomers such as olefin-based thermoplastic elastomers and styrene-based thermoplastic elastomers.

A ratio of the polypropylene-based resin in the base material resin is 50 wt % or more, preferably 70 wt % or more, more preferably 80 wt % or more, still more preferably 90 wt % or more, and particularly preferably 100 wt %.

From a viewpoint of obtaining an expanded beads molded article more excellent in mechanical physical properties such as stiffness, a melting point of the polypropylene-based resin constituting the expanded beads body is preferably 140° C. or higher, more preferably 145° C. or higher, still more preferably 148° C. or higher, and particularly preferably 150° C. or higher. Note that in general, the upper limit of the melting point of the polypropylene-based resin is preferably 160° C., more preferably 158° C., and still more preferably 155° C.

The melting point of the polypropylene-based resin can be determined based on JIS K7121:1987. At this time, "(2) a case where a melting temperature is measured after constant heat treatment" is adopted to adjust states of a test piece.

More specifically, a peak top temperature of a melting peak determined by the DSC curve obtained when using the polypropylene-based resin or the expanded beads as the test piece, the test piece is heated from 23° C. to 200° C. at a heating rate of 10° C./min, then lowered to 23° C. at a cooling rate of 10° C./min, and heated again from 23° C. to 200° C. at a heating rate of 10° C./min based on a heat-flux differential scanning calorimetry described in JIS K7121:1987 is defined as the melting point of the polypropylene-based resin. Note that in a case where two or more of the melting peaks appear in the DSC curve, the temperature at the top of the melting peak having the largest area is taken as the melting point. At this time, it is possible to determine the melting peak having the largest area by distinguishing each melting peak based on a boundary temperature between valleys of the DSC curve positioned between the peak top temperatures of the respective melting peaks, and comparing the areas (heat of fusion) respectively. The temperature between the valleys of the DSC curve can be determined from a temperature at which a value of a vertical axis of a differential curve (DDSC) is 0 with reference to the differential curve of the DSC.

Further, examples of a measurement apparatus include a heat-flux differential scanning calorimeter (manufactured by SII Nano Technology Inc., model number: DSC7020).

NOR type hindered amine:

The expanded beads 20 includes the NOR type hindered amine at a blending ratio in a range of 0.03 wt % or more and 0.5 wt % or less. In a case where the blending ratio of the NOR type hindered amine in the expanded beads 20 is too low, it is difficult to enhance the flame retardancy of the expanded beads molded article to be produced by using the expanded beads. On the other hand, in a case where the blending ratio of the NOR type hindered amine in the expanded beads 20 is too high, cell diameter of the expanded beads 20 tend to be uneven, and the flame retardancy, surface properties, or the like of the expanded beads molded article to be obtained may be deteriorated.

Carbon black may be added to the expanded beads 20 in order to give a black appearance to the expanded beads molded article to be produced by using the expanded beads 20. However, the expanded beads including the carbon black generally tends to be flammable. Therefore, from a viewpoint of making the expanded beads molded article to be obtained less flammable even when the carbon black is included to an extent that black can be exhibited, the blending ratio of the NOR type hindered amine in the expanded beads 20 is preferably 0.05 wt % or more, and more preferably 0.06 wt % or more. However, from a viewpoint of enhancing an in-mold molding property of the expanded beads 20, the blending ratio of the NOR type hindered amine in the expanded beads 20 is preferably 0.4 wt % or less, more preferably 0.3 wt % or less, and still more preferably 0.2 wt % or less.

The blending ratio of the NOR type hindered amine included in the expanded beads 20 can be calculated, for example, from a blending ratio of the NOR type hindered amine in each material for producing the expanded beads 20. For example, attention may be paid to the resin beads 10 prepared for producing the expanded beads 20. As illustrated in the upper part of FIG. 1, the resin beads 10 are materials for producing the expanded beads 20, and the resin bead includes a core layer 11 and a thermoplastic polymer layer 12 covering a surface of the core layer 11. The expanded beads 20 can be obtained by impregnating such resin beads 10 with the blowing agent and foaming the resin beads.

From a relationship among a weight ratio of the core layer 11 to the thermoplastic polymer layer 12, a blending ratio of the NOR type hindered amine in the core layer 11, and a blending ratio of the NOR type hindered amine in the thermoplastic polymer layer 12, a blending ratio of the NOR type hindered amine in the expanded beads 20 thus produced can be calculated.

Further, as another method, the blending ratio of the NOR type hindered amine included in the expanded beads 20 may be directly measured from the expanded beads 20. For example, the blending ratio of the NOR type hindered amine in the expanded beads 20 can be determined by subjecting the expanded beads 20 to, for example, proton nuclear magnetic resonance ($^{1}$H-NMR).

Note that when the blending ratio of the NOR type hindered amine is determined by the proton nuclear magnetic resonance ($^{1}$H-NMR), for example, the following method can be adopted.

First, expanded beads frozen and pulverized is subjected to Soxhlet extraction by using chloroform as a solvent to remove polymer components or the like as a chloroform insoluble part. Next, the chloroform soluble part obtained by the Soxhlet extraction is mixed with acetone to remove an acetone insoluble part. A solid obtained by removing the solvent from the acetone soluble part is used as a measurement sample, and measured by the proton nuclear magnetic resonance ($^{1}$H-NMR). From a relationship between this measurement result and a measurement result of a standard product (internal standard sample) having a known concentration, the blending ratio of the NOR type hindered amine in the expanded beads 20 can be determined.

As an apparatus for performing the measurement by the proton nuclear magnetic resonance ($^{1}$H-NMR), for example, AL-400 model manufactured by JEOL Ltd. may be used. Further, measurement conditions of a solvent of $CDCl_3$ and an internal standard sample of tetrachloroethane (TCE) may be adopted.

In the present invention, the NOR type hindered amine is a compound having a structure of [>N—OR] such as an N-alkoxyl group. Examples of the NOR type hindered amine include a compound having at least one skeleton of the following general formula (1). An optional structure is bonded to R in the general formula (1). Examples of R in the general formula (1) include an alkyl group, a cycloalkyl group, an aralkyl group, and an aryl group or the like. Further, examples of OR in the general formula (1) include a cyclohexyloxy group and an octyloxy group or the like.

[Chemical Formula 1]

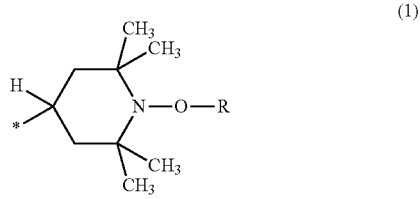

(1)

Where The Position Represented By * is Bonded With Atoms Such as Hydrogen Atoms or an Optional Structure, and R is Bonded With an Optional Structure.

Preferred examples of the NOR type hindered amine used in the present invention include, for example, compounds represented by the following chemical formulae (2) to (4).

The chemical formula (2) is NOR116 (trade name, with a molecular weight of 2261, manufactured by BASF SE), the chemical formula (3) is FP-T80 (trade name, with a molecular weight of 681, manufactured by ADEKA CORPORATION), and the chemical formula (4) is Tinuvin123 (trade name, with a molecular weight of 737, manufactured by BASF SE)

[Chemical Formula 2]

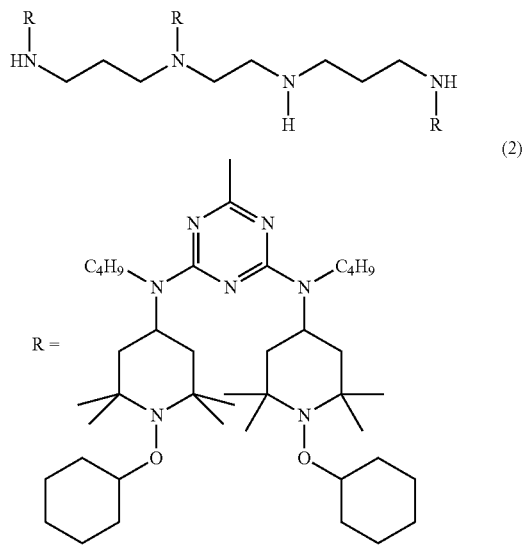

(2)

[Chemical Formula 3]

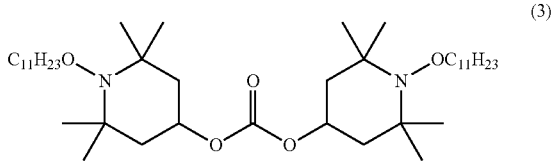

(3)

[Chemical Formula 4]

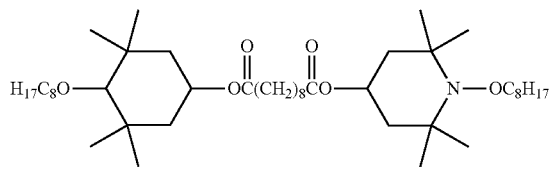

(4)

Note that the expanded beads 20 may include one NOR type hindered amine or two or more NOR type hindered amines. Further, in addition to the NOR type hindered amine, the expanded beads of the present invention may include another flame retardant other than the NOR type hindered amine. Examples of another flame retardant include a halogen-based flame retardant, a phosphorus-based flame retardant, a metal hydroxide, and a hindered amine other than the NOR type hindered amine represented by the general formula (1).

In a case where another flame retardant other than the NOR type hindered amine represented by the general formula (1) is included in the expanded beads 20, a blending ratio of the other flame retardant may be adjusted without departing from the scope of the invention.

The above NOR type hindered amine preferably includes an NOR type hindered amine having a molecular weight of 300 or more and 3000 or less. In this case, the ratio of the NOR type hindered amine having the above molecular weight in the NOR type hindered amine is preferably 50 wt % or more, more preferably 80 wt % or more, and still more preferably 90 wt % or more. Even in a case where expanded beads having a low bulk density or expanded beads including the carbon black are used, use of the NOR type hindered amine having the above molecular weight makes it easy, for example, to obtain an expanded beads molded article capable of stably exhibiting good flame retardancy, and suppress occurrence of unevenness in color tone in the expanded beads molded article to be obtained by molding an expanded beads including a colorant such as carbon black.

From such viewpoint, the molecular weight of the above NOR type hindered amine is preferably 400 or more and 1500 or less, more preferably 500 or more and 1200 or less, and still more preferably 600 or more and 900 or less. Note that reasons why these effects are exhibited are not clear, but the following is considered. The NOR type hindered amine having the above molecular weight is easily mixed with the base material resin constituting the expanded beads 20, and hardly aggregated in the base material resin. Therefore, an aggregate of the NOR type hindered amine is not easily generated in the base material resin, and formation of cell nuclei derived from the aggregate is suppressed. In this way, it is considered that the variation in the cell diameter in the expanded beads is further reduced, and a cell film thickness of the molded article to be obtained tends to be uniform. As a result, it is considered that the flame retardancy of the expanded beads molded article becomes more excellent, and the unevenness in color tone of the expanded beads molded article hardly occurs.

Note that the molecular weight of the NOR type hindered amine described above is the sum of atomic weight of atoms constituting the NOR type hindered amine.

Carbon black:

From a viewpoint that an expanded beads molded article having a black appearance can be provided, the expanded beads 20 preferably includes carbon black. From a viewpoint of easily obtaining an expanded beads molded article having a good black appearance, a blending ratio of the carbon black in the expanded beads 20 is preferably 0.5 wt % or more, more preferably 1.0 wt % or more, still more preferably 1.5 wt % or more, and particularly preferably 2.0 wt % or more. On the other hand, from a viewpoint of making the expanded beads molded article to be obtained less flammable, the blending ratio of the carbon black in the expanded beads 20 is preferably 5 wt % or less, more preferably 4.0 wt % or less, still more preferably 3.5 wt % or less, and particularly preferably 3.2 wt % or less.

Note that the blending ratio of the carbon black in the expanded beads 20 or the thermoplastic polymer layer 22 to be described later can be appropriately calculated from a material used for producing the resin beads 10 used for producing the expanded beads 20.

Further, the blending ratio of the carbon black in the expanded beads 20 or the thermoplastic polymer layer 22 to be described later may be directly measured from a test piece cut out from the expanded beads 20 or the thermoplastic polymer layer 22 to be described later. As a measurement method, the expanded beads 20 or the above test piece are/is measured based on JIS K7120: 1987 by using a thermogravimetric differential thermal analyzer (that is, TG-DTA), and the blending ratio of the included carbon black can be determined based on a mass reduction rate from 400° C. to 1000° C. in the TG curve to be obtained.

As the carbon black, for example, channel black, roller black, furnace black, thermal black, acetylene black, and ketjen black may be used. Among them, the furnace black is preferable as the carbon black used in the present invention because it is excellent in a balance between dispersibility in the polypropylene resin and material cost.

Other Additives:

The expanded beads 20 described above may include optional additives such as a flame retardant, a flame retardant auxiliary, a cell controlling agent, a lubricant, a crystal nucleating agent, a colorant, a conductive material, and an antistatic agent.

(Thermoplastic Polymer Layer)

The expanded beads 20 have a thermoplastic polymer layer 22 on the surface. FIG. 1 illustrates an aspect in which the thermoplastic polymer layer 22 and a portion (expanded beads body) to the center side of the expanded beads than the layer can be clearly confirmed in the cross section of the expanded beads 20, but the boundary between the thermoplastic polymer layer 22 and a region (expanded beads body) to the center side than the layer may not be clear or unclear.

In the present invention, relatively reducing the blending ratio of the NOR type hindered amine in the surface layer of the expanded beads 20 prevents the fusion-bonding characteristics of the expanded beads 20 to one another during the in-mold molding from being impaired. Therefore, the blending ratio of the NOR type hindered amine in in the thermoplastic polymer layer 22 is adjusted to be lower than the blending ratio of the NOR type hindered amine included in the entire expanded beads 20. In other words, the thermoplastic polymer layer 22 serves as an adjustment layer for reducing the blending ratio of the NOR type hindered amine in the surface layer of the expanded beads 20.

The thermoplastic polymer layer 22 is composed of a thermoplastic resin composition including no NOR type hindered amine or a thermoplastic resin composition including the NOR type hindered amine at a blending ratio lower than the blending ratio of the NOR type hindered amine included in the entire expanded beads 20.

Base Material Resin Constituting Thermoplastic Polymer Layer:

Examples of the base material resin of the thermoplastic resin composition described above include one or a combination of two or more resins selected from thermoplastic resins such as a polyolefin-based resin, a polystyrene-based resin, a polyamide-based resin and a polyester-based resin. Among them, the base material resin constituting the thermoplastic resin composition described above is preferably a polyolefin-based resin.

Examples of the above polyolefin-based resin include, for example, a polypropylene-based resin and a polyethylene-based resin. Examples of the polypropylene-based resin include the polypropylene-based resin exemplified as the base material resin constituting the expanded beads body described above. Further, examples of the polyethylene-based resin include high-density polyethylene, linear low-density polyethylene, low-density polyethylene, an ethylene-vinyl acetate copolymer, an ethylene-acrylic acid copolymer, and an ethylene-methacrylic acid copolymer.

From a viewpoint of stably and easily enhancing the mechanical properties of the molded article to be obtained, the base material resin of the thermoplastic resin composition preferably includes the polypropylene-based resin. Further, from the same viewpoint, the polypropylene-based resin is preferably a polypropylene-based copolymer, and more preferably one or two or more polypropylene-based copolymers selected from a propylene-ethylene copolymer, a propylene-butene copolymer, and a propylene-ethylene-butene copolymer. In that case, the ratio of the polypropylene-based resin in the base material resin is preferably 50 wt % or more, more preferably 70 wt % or more, still more preferably 90 wt % or more, and particularly preferably 100 wt %. Note that for details of the polypropylene-based resin included in the thermoplastic polymer layer 22, the description of the polypropylene-based resin used for constituting the expanded beads body described above is appropriately referred to. In a case where the thermoplastic polymer layer 22 includes the polypropylene-based resin, the polypropylene-based resin may be the same as or different from the polypropylene-based resin constituting the expanded beads body.

Melting Point of Base Material Resin Constituting Thermoplastic Polymer Layer:

The melting point of the base material resin constituting the thermoplastic polymer layer 22 is not particularly limited, and may be the same as or different from the melting point of the base material resin constituting the expanded beads body.

An aspect in which the melting point or a softening point of the base material resin constituting the thermoplastic polymer layer 22 is lower than the melting point of the base material resin constituting the expanded beads body is preferable. In this way, the thermoplastic polymer layer 22 also functions as a fusion-bonding layer that enhances the fusion-bonding characteristics of the expanded beads to each other during the in-mold molding, and the fusion-bonding characteristics of the expanded beads 20 to one another during the in-mold molding can be further enhanced. In order to more efficiently perform functions of the fusion-bonding layer, the base material resin of the thermoplastic polymer layer 22 preferably includes, for example, a crystalline polyolefin-based resin having a melting point lower than the melting point of the polypropylene-based resin constituting the expanded beads body, an amorphous polyolefin-based resin having a softening point lower than the melting point of the polypropylene-based resin constituting the expanded beads body, and an adhesive resin such as a urethane resin.

In a case where the base material resin of the thermoplastic polymer layer 22 is a polyolefin-based resin, from a viewpoint of easily suppressing adhesion of the thermoplastic polymer layer to a mold, a difference between the melting point of the polypropylene-based resin constituting the expanded beads body and the melting point of the polyolefin-based resin constituting the thermoplastic polymer layer 22 is preferably 30° C. or lower, more preferably 25° C. or lower, and still more preferably 20° C. or lower. On the other hand, from a viewpoint of enhancing the fusion-bonding characteristics of the expanded beads to each other and further enhancing the in-mold molding property under low molding pressure conditions, the difference between the melting point of the polypropylene-based resin constituting the expanded beads body and the melting point of the polyolefin-based resin constituting the thermoplastic polymer layer 22 is preferably 3° C. or higher, more preferably 5° C. or higher, and still more preferably 8° C. or higher.

Further, the melting point of the above polyolefin-based resin is preferably 100° C. or higher and 150° C. or lower, more preferably 110° C. or higher and 148° C. or lower, and still more preferably 120° C. or higher and 145° C. or lower.

Note that the softening point (Vicat softening temperature) of the resin is measured based on an A50 method of JIS K7206: 2016. Further, the melting point of the resin is measured based on JIS K7121: 1987 in the same manner as the melting point of the polypropylene-based resin constituting the expanded beads body.

The melting point of the base material resin of the thermoplastic polymer layer 22 is equivalent to the melting point of the base material resin of the thermoplastic polymer layer 12 in the resin beads 10 used for producing the expanded beads 20. Accordingly, by measuring the melting point of the base material resin of the thermoplastic polymer layer 12 in the resin beads 10 in advance according to the method for measuring the melting point of the base material resin of the expanded beads body described above, the melting point of the base material resin of the thermoplastic polymer layer 22 of the expanded beads 20 can be grasped.

A ratio of the thermoplastic polymer layer 22 in the expanded beads 20 is preferably 0.5 wt % or more and 10 wt % or less. In this way, a balance between the thermoplastic polymer layer 22 and a portion (expanded beads body) of the expanded beads 20 other than the thermoplastic polymer layer 22 is good, and the expanded beads molded article produced by using such expanded beads 20 is excellent in fusion-bonding characteristics and excellent in mechanical physical properties. From a viewpoint of more stably improving the fusion-bonding characteristics of the expanded beads 20 to each other, the ratio of the thermoplastic polymer layer 22 in the expanded beads 20 is more preferably 1 wt % or more, and still more preferably 2 wt % or more. However, from a viewpoint of further improving the mechanical physical properties of the expanded beads molded article, the ratio of the thermoplastic polymer layer 22 in the expanded beads 20 is preferably 8 wt % or less, more preferably 6 wt % or less, still more preferably 4 wt % or less, and particularly preferably 3 wt % or less.

Note that that in the present invention, in order to further improve the mechanical properties of the expanded beads molded article, even in a case where the base material resin constituting the expanded beads 20 is composed of a polypropylene-based resin having a high melting point and the ratio of the thermoplastic polymer layer 22 in the expanded beads 20 is reduced, the fusion-bonding characteristics of the expanded beads to one another can be enhanced without impairing the flame retardancy of the molded article. As long as the problems of the present invention can be achieved, the thermoplastic polymer layer 22 may be provided on the entire surface of the expanded beads 20 or may be provided on a part of the surface, regardless of presence or absence of the functions of the fusion-bonding layer.

Carbon Black:

In order to favorably impart a black appearance to the expanded beads molded article to be produced by using the expanded beads 20, the carbon black is also preferably blended in the thermoplastic polymer layer 22. By blending the carbon black not only in the expanded beads body but also in the thermoplastic polymer layer 22, a black expanded beads molded article in which unevenness in color tone is suppressed may be provided. From a viewpoint of sufficiently suppressing unevenness in color tone and easily obtaining an expanded beads molded article having a good appearance, the blending ratio of the carbon black in the thermoplastic polymer layer 22 is preferably 0.5 wt % or more, more preferably 1.0 wt % or more, still more preferably 1.5 wt % or more, and particularly preferably 2.0 wt % or more.

On the other hand, from a viewpoint of enhancing the in-mold molding property of the expanded beads 20 and making the expanded beads molded article to be obtained less flammable, the blending ratio of the carbon black in the thermoplastic polymer layer 22 is preferably 5.0 wt % or less, more preferably 4.0 wt % or less, still more preferably 3.5 wt % or less, and particularly preferably 3.2 wt % or less.

Other Additives:

The resin composition constituting the thermoplastic polymer layer 22 may include one or more other additives within a range not departing from the scope of the invention. Examples of the other additives include a flame retardant, a flame retardant auxiliary, a lubricant, a crystal nucleating agent, a colorant, a conductive material, and an antistatic agent.

(Surface Layer)

Next, the surface layer 30 will be described.

In the present invention, the surface layer 30 is constituted of the thermoplastic polymer layer 22.

A blending ratio of the NOR type hindered amine in such surface layer 30 is adjusted to be lower than the blending ratio of the NOR type hindered amine in the entire expanded beads 20, so that the problems of the present invention may be achieved. Such adjustment is made with the thermoplastic polymer layer 22 as described above.

The blending ratio of the NOR type hindered amine in the surface layer 30 (thermoplastic polymer layer 22) can be calculated based on a numerical value grasped from a material constituting the expanded beads 20. Note that the blending ratio of the NOR type hindered amine in the thermoplastic polymer layer 12 of the resin beads 10 used for producing the expanded beads 20 corresponds to the blending ratio of the NOR type hindered amine in the surface layer 30 (thermoplastic polymer layer 22). Further, the blending ratio of the NOR type hindered amine in the expanded beads 20 corresponds to the blending ratio of the NOR type hindered amine in the entire resin beads 10 used for producing the expanded beads 20. Accordingly, from a blending ratio of each material in a process of producing the resin beads 10, it is possible to know the blending ratio of the NOR type hindered amine in the entire expanded beads 20 and the surface layer of the expanded beads 20.

Further, the blending ratio of the NOR type hindered amine in the entire expanded beads 20 or the surface layer 30 of the expanded beads 20 substantially corresponds to a content ratio of the NOR type hindered amine in the entire expanded beads 20 or the surface layer 30 of the expanded beads 20, respectively. Therefore, in a case where the blending ratio of each material in the process of producing the resin beads 10 is unknown, whether the blending ratio of the NOR type hindered amine in the surface layer 30 is lower than the blending ratio of the NOR type hindered amine in the expanded beads 20 can be checked by measuring the content ratio of the NOR type hindered amine by using the expanded beads 20. In this case, for example, the content ratio of the NOR type hindered amine in the expanded beads 20 may be directly measured by subjecting the entire expanded beads 20 to, for example, proton nuclear magnetic resonance ($^1$H-NMR) as a measurement sample. Further, the content ratio of the NOR type hindered amine in the surface layer 30 may be directly measured by subjecting a part of the surface layer 30 of the expanded beads 20 to, for example, proton nuclear magnetic resonance ($^1$H-NMR) as a measurement sample.

Note that in a case where only the thermoplastic polymer layer 22 is difficultly cut out from the expanded beads 20 or a case where whether or not only the thermoplastic polymer layer 22 is cut out is unknown, the surface layer 30 of the expanded beads 20 is handled as in the lower part of FIG. 1 or FIG. 2 described below, and whether the blending ratio of the NOR type hindered amine in the surface layer 30 is lower than the blending ratio of the NOR type hindered amine in the expanded beads 20 can be checked. Note that the lower parts of FIG. 1 and FIG. 2 are cross-sectional views of the expanded beads 20.

First, as long as the thermoplastic polymer layer 22 in the expanded beads 20 is a layer having a sufficient thickness to such extent that only the thermoplastic polymer layer can be cut out, a layer formed by the thermoplastic polymer layer 22 is defined as a surface layer 30 (surface layer 30A), as illustrated in the lower part of FIG. 1. On the other hand, in a case where the thermoplastic polymer layer 22 does not have a thickness to such extent that only the thermoplastic polymer layer can be cut out, a layer including the thermoplastic polymer layer 22 and a part of a region closer to the center side of the expanded beads than the thermoplastic polymer layer 22 is defined as a surface layer 30 (surface layer 30B), as illustrated in in FIG. 2.

Here, even when the surface layer 30 corresponds to either the surface layer 30A or the surface layer 30B, the surface layer 30 is cut out from the expanded beads 20 to prepare a measurement sample, and the measurement sample is subjected to, for example, proton nuclear magnetic resonance ($^1$H-NMR) to determine the content ratio of the NOR type hindered amine in the surface layer 30. Further, the entire expanded beads 20 is used as a sample, and the sample is subjected to, for example, proton nuclear magnetic resonance (1H-NMR) to determine the content ratio of the NOR type hindered amine in the expanded beads 20. Then, in a case where the content ratio of the NOR type hindered amine in the surface layer 30 is lower than the content ratio of the NOR type hindered amine in the entire expanded beads 20, it is possible to determine that the blending ratio of the NOR type hindered amine in the surface layer 30 is lower than the blending ratio of the NOR type hindered amine in the expanded beads 20.

The blending ratio of the NOR type hindered amine in the thermoplastic polymer layer 22 is preferably 0.2 wt % or less (including 0), more preferably 0.15 wt % or less, still more preferably 0.1 wt % or less, still more preferably 0.05 wt % or less, and particularly preferably substantially 0 wt %. The expanded beads 20 having the thermoplastic polymer layer 22 of such blending ratio can exhibit excellent in-mold molding property even under low molding pressure conditions. Further, even when in a case where the bulk density of the expanded beads 20 is sufficiently low, or a case where a base material resin of the expanded beads 20 is a polypropylene-based resin having a high melting point (for example 145° C. or higher), the expanded beads 20 having the thermoplastic polymer layer 22 of such blending ratio is good in fusion-bonding characteristics of the expanded beads 20 to each other during the in-mold molding.

From a viewpoint that the fusion-bonding characteristics of the expanded beads 20 to one another can be stably enhanced even in a case where the base material resin constituting the expanded beads 20 is a polypropylene-based resin having a high melting point, it is preferable that the blending ratio of the NOR type hindered amine in the thermoplastic polymer layer 22 of the expanded beads 20 is substantially 0. However, from a viewpoint of exhibiting higher flame retardancy while efficiently maintaining the fusion-bonding characteristics of the expanded beads 20 to one another, the blending ratio of the NOR type hindered amine in the thermoplastic polymer layer 22 is preferably 0.01 wt % or more, and more preferably 0.02 wt % or more.

[Method for Producing Polypropylene-Based Resin Expanded Beads]

Next, the production method of the present invention will be described. The production method of the present invention is a preferred embodiment of the method for producing polypropylene-based resin expanded beads of the present invention. However, the method for producing polypropylene-based resin expanded beads of the present invention is not limited to the production method of the present invention at all.

As illustrated in FIG. 1, the production method of the present invention is a method in which first a multilayer bead (resin beads 10) is granulated and the bead is foamed to obtain an expanded beads 20.

Specifically, the production method of the present invention includes a covering step of covering a core layer 11 including a polypropylene-based resin as a base material resin and an NOR type hindered amine with a thermoplastic polymer layer 12, and a foaming step of foaming the resin beads 10 having the core layer 11 and the thermoplastic polymer layer 12 obtained by the covering step to obtain a polypropylene-based resin expanded beads 20 including the NOR type hindered amine and having a surface on which a thermoplastic polymer layer 22 is located.

The resin beads 10 to be granulated in the above covering step is prepared such that the blending ratio of the NOR type hindered amine in the resin beads 10 is 0.03 wt % or more and 0.5 wt % or less, and the blending ratio of the NOR type hindered amine in the thermoplastic polymer layer 12 is less than the blending ratio of the NOR type hindered amine in the resin beads 10 (including 0).

Note that the thermoplastic polymer layer 12 provided on the surface of the core layer 11 becomes the thermoplastic polymer layer 22 provided on the surface of the expanded beads 20 by foaming the resin beads 10. Therefore, the thermoplastic polymer layer 12 can also be referred to as a pre-thermoplastic polymer layer for the thermoplastic polymer layer 22.

By including the covering step and the foaming step described above and adjusting the blending ratio of the NOR type hindered amine in the core layer 11 and the thermoplastic polymer layer 12 to an appropriate range, the expanded beads 20 of the present invention may be efficiently produced.

(Covering Step)

The covering step is a step of covering the surface of the core layer 11 including the polypropylene-based resin as a base material resin and the NOR type hindered amine with the thermoplastic polymer layer 12.

Examples of the method for covering the core layer 11 with the thermoplastic polymer layer 12 include a co-extrusion method or a mixing method described below.

Co-Extrusion Method:

In the above co-extrusion method, first, a base material resin for forming the core layer 11 and a cell controlling agent or the like to be added as needed are supplied to a core layer forming extruder, the base material resin is melted in the extruder and the melt product is kneaded to obtain a melt-kneaded product for forming the core layer. On the other hand a base material resin etc. for forming the thermoplastic polymer layer 12 is supplied to a thermoplastic polymer layer forming extruder, the base material resin is melted in the extruder and the melt product is kneaded to obtain a melt-kneaded product for forming the thermoplastic polymer layer. Next, the melt-kneaded product for forming the core layer and the melt-kneaded product for forming the thermoplastic polymer layer are merged in a co-extrusion die provided downstream of the core layer forming extruder, and the melt-kneaded product for forming the thermoplastic polymer layer is laminated on the outer periphery of the melt-kneaded product for forming the core layer in the die and extruded to form a strand having a multilayer structure. Next, the strand is cut into a desired size with a pelletizer or the like to obtain the resin beads 10 having a multilayer structure. The strand is a laminate having a cross section orthogonal to an extrusion direction in a circular shape etc. The resin beads 10 thus obtained have, for example, a columnar shape such as a round columnar shape, with the core layer 11 at the center, and does not have the thermoplastic polymer layer 12 on either end surface, but have the thermoplastic polymer layer 12 formed on the outer peripheral surface other than the both end surfaces. In this way, the core layer 11 may be exposed at a part of the resin beads 10. The method for laminating the thermoplastic polymer layer 12 on the surface of the core layer 11 by the co-extrusion method is preferable in that the ratio of the thermoplastic polymer layer 12 in the resin beads 10 can be easily adjusted and that the thermoplastic polymer layer 12 having a relatively uniform thickness can be formed on the resin beads 10 with high productivity.

Note that in the above co-extrusion method, when the resin beads 10 having a multilayer structure is obtained, for example, example, a type of the base material resin of the thermoplastic polymer layer 12, the ratio of the thermoplastic polymer layer 12 in the resin beads 10, extrusion conditions, and cutting conditions are preferably adjusted. Then, for example, by adopting a method for cutting strands in a state where the strands are sufficiently softened, the resin beads 10 in which substantially the entire surface of the core layer 11 is covered with the thermoplastic polymer layer 12 may be obtained. Further, the resin beads 10 having a substantially spherical shape can be obtained by, for example, heating the resin beads 10 having a cylindrical shape in the dispersion medium at a temperature equal to or higher than the melting point of the base material resin constituting the core layer 11 for a predetermined time period and subjecting them to a spheroidization treatment.

Mixing Method:

An example of a method for granulating the resin beads 10 by the above mixing method is as follows. First, a base material resin for forming the core layer 11 and a cell controlling agent or the like to be added as needed are supplied to a core layer forming extruder, the base material resin is melted in the extruder and the melt product is kneaded to obtain a melt-kneaded product for forming the core layer. The melt-kneaded product for forming the core layer is extruded from the extruder to form a strand. Next, the strand is cut into a desired size with, for example, a pelletizer to granulate the core layer 11 in a particulate form. Next, the core layer 11 in a particulate form is charged into, for example, a mixing apparatus having a mixing function and a heating function, and heated to heat the surface layer portion of the core layer 11. Next, a resin composition for constituting the thermoplastic polymer layer 12 is charged into the above mixing apparatus, the heated core layer 11 in a particulate form and the resin composition for the thermoplastic polymer layer are mixed, and the surface of the core layer 11 is covered with the resin composition for a thermoplastic polymer layer to obtain a resin beads 10 having a multilayer structure. Such mixing method is preferable in that the thermoplastic polymer layer 12 is easily formed on the entire surface of the core layer 11.

In the co-extrusion method or the mixing method described above, the melt-kneaded product for forming the core layer includes the polypropylene-based resin as the base material resin of the expanded beads body described above and the NOR type hindered amine. Further, the melt-kneaded product for forming the core layer may also optionally include other additives such as carbon black. A resin melt product for forming the core layer is adjusted such that the blending ratio of the NOR type hindered amine in the resin beads 10 is 0.03 wt % or more and 0.5 wt % or less.

Further, the melt-kneaded product for forming the thermoplastic polymer layer or the resin composition for forming the thermoplastic polymer layer includes the NOR type hindered amine at a ratio less than the blending ratio of the NOR type hindered amine in the expanded beads 20 to be obtained (including 0). Further, other additives such as carbon black may be also optionally included.

In the covering step described above, the ratio of the thermoplastic polymer layer 12 in the resin beads 10 is preferably adjusted to 0.5 wt % or more and 10 wt % or less. In this way, a balance between the thermoplastic polymer layer 22 and a portion (expanded beads body) of the expanded beads 20 other than the thermoplastic polymer layer 22 is improved, and the expanded beads molded article produced by using such expanded beads 20 is excellent in fusion-bonding characteristics and excellent in mechanical physical properties. From a viewpoint of more stably improving the fusion-bonding characteristics of the expanded beads 20 to each other, the ratio of the thermoplastic polymer layer 12 in the resin beads 10 is more preferably 1 wt % or more, and still more preferably 2 wt % or more. On the other hand, from a viewpoint of further improving the mechanical physical properties of the expanded beads molded article, the ratio of the thermoplastic polymer layer 12 in the resin beads 10 is preferably 8 wt % or less, more preferably 6 wt % or less, still more preferably 4 wt % or less, and particularly preferably 3 wt % or less.

Note that in the present invention, in order to further improve the mechanical properties of the expanded beads molded article, even in a case where the base material resin constituting the resin beads 10 is composed of a polypropylene-based resin having a high melting point and the ratio of the thermoplastic polymer layer 12 in the resin beads 10 is reduced, the fusion-bonding characteristics of the expanded beads 20 to one another can be enhanced without impairing the flame retardancy of the molded article.

Adjustment of Crystallinity of Expanded Beads:

Note that in order to adjust a crystalline state of the expanded beads 20 to be obtained, when the resin beads 10 are dispersed in the aqueous medium or when the resin beads 10 are impregnated with the blowing agent, for example, adjustment of a temperature rising rate in a sealed vessel or maintaining the sealed vessel at a predetermined temperature for a predetermined time period may be performed. For example, in the DSC curve obtained by heat flux differential scanning calorimetry, it is possible to perform adjustment such that an endothermic peak (high-temperature peak) appears on a higher temperature side than an endothermic peak (intrinsic peak) of the main component of the base material resin constituting the main body of the expanded beads 20. The expanded beads 20 showing a high-temperature peak in this way is preferable from a viewpoint of a wider molding condition range in which a good expanded beads molded article can be obtained. The temperature adjustment for obtaining the high-temperature peak described above is referred to, for example, in JP 4077745 B.

Note that the total heat of fusion in the expanded beads 20 to be obtained is preferably 50 J/g or more and 120 J/g or less, and more preferably 60 J/g or more and 100 J/g or less. Further, the endothermic quantity (high-temperature peak heat) of the high-temperature peak of fusion in the expanded beads 20 to be obtained is preferably 5 J/g or more and 50 J/g or less, more preferably 8 J/g or more and 40 J/g or less, and still more preferably 10 J/g or more and 30 J/g or less.

The total heat of fusion and the high-temperature peak heat of fusion in the expanded beads 20 are determined from the DSC curve to be obtained by heating 1 to 3 mg of the expanded beads as a test piece at a heating rate of 10° C./min from 23° C. to a temperature of 30° C. higher than the end of the melting peak of the test piece based on JIS K7122: 1987.

(Foaming Step)

The foaming step is performed by using the resin beads 10 obtained by the covering step. The foaming step may be performed by appropriately selecting a known foaming method in which the resin beads is impregnated with the blowing agent and foamed.

For example, in the foaming step, first, the resin beads 10 are dispersed in an aqueous medium in a sealed vessel. At this time, the sealed vessel may further contain the inorganic dispersant and other additives. Then, in parallel with dispersion of the resin beads 10 in the sealed vessel or after completion of the dispersion, a physical blowing agent is added to the sealed vessel and the resin beads 10 are impregnated with the physical blowing agent to obtain expandable resin beads. The physical blowing agent may be added into the sealed vessel before the resin beads 10 are foamed. For example, in a case where carbon dioxide is used as the physical blowing agent, the carbon dioxide may be added to the aqueous medium together with the resin beads 10 in a form of dry ice, or may be injected into a sealed vessel in a gaseous state. The resin beads 10 are preferably impregnated with the physical blowing agent under heating and/or pressurization.

The expandable resin beads obtained as described above are released together with the aqueous medium under a pressure lower than the internal pressure of the sealed vessel to be foamed, thereby expanded beads 20 are obtained.

Aqueous Medium:

As the aqueous medium for dispersing the resin beads 10 described above, water is usually adopted, but for example, alcohols, glycols, and glycerin may also be adopted. From a viewpoint of improving the dispersibility of the resin beads 10 and the productivity of the expanded beads 20, the amount of the resin beads 10 added to the aqueous medium is preferably 10 parts by weight or more and 100 parts by weight or less, and more preferably 20 parts by weight or more and 80 parts by weight or less with respect to 100 parts by weight of the aqueous medium.

Inorganic dispersant:

As the above inorganic dispersant, for example, inorganic fine particles such as aluminum oxide, tricalcium phosphate, magnesium pyrophosphate, zinc oxide, kaolin, and mica may be used. These inorganic fine particles may be used alone, or in combination of two or more kinds. Among them, kaolin is preferably used because it is excellent in blocking suppressing effect. Note that the blocking refers to a phenomenon in which the expanded beads adhere to one another during the foaming step.

Other Additives:

The aqueous medium may further include one or more optional additives such as a dispersion auxiliary agent and a surfactant in addition to the inorganic dispersant. Examples of the dispersion auxiliary agent include aluminum sulfate. Further, examples of the surfactant include, for example, anionic surfactants such as sodium alkylbenzene sulfonate, sodium dodecylbenzene sulfonate, and sodium alkanesulfonate. The surfactants may be used alone, or in combination of two or more kinds.

Physical Blowing Agent:

As the physical blowing agent, an inorganic physical blowing agent and/or an organic physical blowing agent may be used. Examples of the inorganic physical blowing agent include carbon dioxide, air, nitrogen, helium, argon, and water. Examples of the organic physical blowing agent include aliphatic hydrocarbons such as propane, butane, and hexane, alicyclic hydrocarbons such as cyclopentane and cyclohexane, as well as halogenated hydrocarbons such as methyl chloride, ethyl chloride, methylene chloride, 2,3,3, 3-tetrafluoropropene, trans-1,3,3,3-tetrafluoropropene, and trans-1-chloro-3,3,3-trifluoropropene.

These physical blowing agents may be used alone or two or more of them may be used in combination. Among these blowing agents, a blowing agent including, as a main component, the inorganic physical blowing agent such as carbon dioxide, nitrogen, or air is preferably used, and carbon dioxide is more preferably used. In the present invention, including, as a main component, the above inorganic physical blowing agent means that the physical blowing agent includes 50 mol % or more of the inorganic physical blowing agent. The physical blowing agent preferably includes the inorganic physical blowing agent in an amount of 70 mol % or more, more preferably 90 mol % or more, and the physical blowing agent further preferably includes merely the inorganic physical blowing agent.

The amount of the physical blowing agent added is appropriately selected according to, for example, a type of the polyolefin-based resin, a type of the blowing agent, and a bulk density of the objective expanded beads. For example, in a case where carbon dioxide is used as the physical blowing agent, the amount of the carbon dioxide added is preferably 0.1 parts by weight or more and 30 parts by weight or less, more preferably 0.5 parts by weight or more and 15 parts by weight or less, and still more preferably 1 part by weight or more and 10 parts by weight or less with respect to 100 parts by weight of the resin beads 10.

Bulk Density of Expanded Beads:

The bulk density of the expanded beads 20 is not particularly limited, but from a viewpoint of further enhancing the stiffness etc. of the expanded beads molded article, the bulk density of the expanded beads 20 is preferably 10 kg/m$^3$ or more, more preferably 15 kg/m$^3$ or more, and still more preferably 18 kg/m$^3$ or more.

In general, in a case where the bulk density of the expanded beads 20 is low, the amount of the resin in the expanded beads 20 decreases, so that a combustion speed of the expanded beads 20 tends to increase. However, in the present invention, since a sufficient amount of the NOR type hindered amine is blended in the expanded beads 20, good flame retardancy can be exhibited even in a case where the bulk density is low.

Further, from a viewpoint of further improving lightweight properties of the expanded beads molded article, the bulk density is preferably 500 kg/m$^3$ or less, more preferably 100 kg/m$^3$ or less, still more preferably 50 kg/m$^3$ or less, and particularly preferably 40 kg/m$^3$ or less.

Bulk Density Adjustment:

The bulk density of the expanded beads 20 may be adjusted, for example, by appropriately changing the foaming conditions such as the temperature and the pressure in the sealed vessel when the contents of the sealed vessel are released in the foaming step.

Further, in a case where the expanded beads 20 having a lower bulk density are desired, a step of foaming the expanded beads in multiple stages as a two-stage foaming step described below may be performed. In the two-stage foaming step, first, the expanded beads 20 obtained as described above are stored in a pressurizable sealed vessel, and a pressure treatment is performed by injecting a gas such as air into the sealed vessel to increase the pressure in a cell of the expanded beads 20. Then, the two-stage foaming is performed by taking out them from the sealed vessel, and heating the expanded beads by using steam or hot air to foam the expanded beads 20. Performing such two-stage foaming step can provide the expanded beads 20 (two-stage expanded beads) having a lower bulk density.

Further, it is easier to increase the cell diameter of the expanded beads 20 that are finally obtained through the two-stage foaming step for obtaining expanded beads 20 having a low bulk density as compared with a one-stage foaming step for obtaining the expanded beads 20 having a low bulk density. With the expanded beads molded article produced by using the expanded beads 20 obtained by performing the two-stage foaming step, the occurrence of unevenness in color tones can be more effectively suppressed.

Method for Measuring Bulk Density:

The bulk density of the expanded beads 20 is measured in the following method. First, the expanded beads 20 to be measured is left for 24 hours or more in an environment of an air temperature of 23° C., a relative humidity of 50%, and 1 atm. The expanded beads group thus obtained having a weight W (g) is filled in a measuring cylinder, and a bottom surface of the measuring cylinder is lightly tapped several times on a floor surface to stabilize a filling height of the expanded beads group in the measuring cylinder. A bulk volume V (L) of the expanded beads group indicated by a scale of the measuring cylinder is read, and a weight W of the expanded beads group is divided by the bulk volume V of the expanded beads group (W/V). By converting the value thus obtained into kg/m$^3$ through unit conversion, the bulk density (kg/m$^3$) of the expanded beads 20 can be obtained.

[Different Production Method for Expanded Beads]

The expanded beads 20 may be produced by a production method (hereinafter, also referred to as a second production method) different from the production method of the present invention described above.

As illustrated in FIG. 3, the second production method is a method in which first, a resin beads body 101 to be an expanded beads body, is granulated, the resin beads body is foamed to obtain an expanded beads body 102, and then a surface of the expanded beads body 102 is covered with the thermoplastic polymer layer 22 to obtain the expanded beads 20.

In other words, the second production method includes a foaming step of foaming the resin beads body 101 including a polypropylene-based resin as a base material resin and an NOR type hindered amine to obtain the expanded beads body 102, and a covering step of covering the expanded beads body 102 obtained by the foaming step with the thermoplastic polymer layer 22 to obtain the polypropylene-based resin expanded beads 20 including the NOR type hindered amine and having a surface on which the thermoplastic polymer layer 22 is located.

Also in the second production method, the blending ratio of the NOR type hindered amine in the expanded beads 20 to be obtained is adjusted to be 0.03 wt % or more and 0.5 wt % or less, and the blending ratio of the NOR type hindered amine in the thermoplastic polymer layer 22 is adjusted to be lower than the blending ratio of the NOR type hindered amine in the expanded beads 20. In the thermoplastic polymer layer 22, the blending ratio of the NOR type hindered amine may be 0 wt %.

In the foaming step of the second production method, for example, a melt product similar to the melt-kneaded product for forming the core layer in the production method of the present invention described above is extruded from an extruder to prepare a strand, and the strand is cut into a desired size to granulate the resin beads body 101. Then, the resin beads body 101 is foamed by a known foaming method to obtain the expanded beads body 102.

The covering step of the second production method is performed by using the expanded beads body 102 obtained as described above. As for the covering step, the mixing method in the production method of the present invention is appropriately referred to. As an example, the expanded beads body 102 is charged into a mixing apparatus having a mixing function and a heating function and heated, and then a powdery resin composition for the thermoplastic polymer layer for constituting the thermoplastic polymer layer 22 is charged. Then, the expanded beads body 102 is mixed with the resin composition for the thermoplastic polymer layer, and the surface of the expanded beads body 102 is covered with the resin composition for the thermoplastic polymer layer to obtain the expanded beads 20 having a surface on which the thermoplastic polymer layer 22 is located.

[Expanded Beads Molded Article]

The expanded beads molded article may be obtained by performing the in-mold molding through using the expanded beads 20 of the present invention. Specifically, the expanded beads molded article is produced as follows. First, the expanded beads are filled in a mold having a cavity corresponding to a desired shape of the expanded beads molded article, and the expanded beads 20 filled in the mold are heated by a heating medium such as steam. The expanded beads 20 in the cavity are softened by heating and fused to each other. In this way, the expanded beads 20 are integrated with each other, and the expanded beads molded article corresponding to a shape of the cavity is obtained.

The expanded beads molded article produced by using the expanded beads 20 receives the effects of the present invention, exhibits good flame retardancy, and is also excellent in fusion-bonding characteristics. Therefore, the expanded beads molded article may be suitably used for various applications such as packaging materials, automobile members, and building materials.

Flame Retardancy:

The flame retardancy of the expanded beads molded article can be evaluated based on a combustion end position, a combustion duration, and a combustion distance in a case where a flammability test defined in a Federal Motor Vehicle Safety Standard (FMVSS) No. 302 is performed. Specifically, a flammability test method defined in the FMVSS No. 302 is as follows.

First, the expanded beads 20 are in-mold molded, and then a plate-shaped test body is cut out from the obtained expanded beads molded article. Next, the test body is left for 24 hours in an environment of a temperature of 23° C. and a relative humidity of 50% to adjust a state of the test body. In the test body with the state adjusted, a start line is drawn at a position 38 mm away from a base end in a lengthwise direction, and an end line is drawn at a position 292 mm away from the base end. Next, the test body is attached to a U-shaped frame of an FMVSS No. 302 dedicated chamber.

Next, a burner is ignited, and the amount of gas and the amount of air or the like are adjusted such that a height of flame is 38 mm. In this state, the burner is moved such that a center of a tip of the burner is a center of the base end of the test body in a width direction, and the flame of the burner is brought into contact with the test body for 15 seconds. Then, the flame of the burner is separated from the test body, and combustion duration from when a combustion position of the test body reaches the start line to when the combustion ends is measured.

In the present description, a flame retardancy degree of the expanded beads molded article is classified into any one of three stages, that is, a self-extinguishing property, a flame retardancy, and a flammability. Specifically, in a case where the combustion of the test body ends before reaching the start line, or a case where a combustion end position of the test body is within 50 mm from the start line and the combustion duration is within 60 seconds, it is determined that the expanded beads molded article has the self-extinguishing property. Further, in a case where the self-extinguishing property described before is not applicable and a combustion speed to be obtained by dividing the combustion distance from the start line by the combustion duration is less than 80 mm/min, it is determined that the expanded beads molded article has the flame retardancy. Then, in case where the self-extinguishing property is not applicable and the combustion speed is 80 mm/min or more, it is determined that the expanded beads molded article has the flammability.

The expanded beads molded article preferably has the flame retardancy property when subjected to a flammability test defined in the FMVSS No. 302, and more preferably has the self-extinguishing property. The expanded beads molded article exhibiting the flame retardancy property or the self-extinguishing property can be suitably used for applications requiring high flame retardancy. In particular, the expanded beads molded article having the self-extinguishing property is suitable for applications such as automobile members and building materials.

Apparent Density:

The apparent density of the expanded beads molded article to be obtained by using the expanded beads 20 is not particularly limited, but from a viewpoint of an excellent balance between the lightweight properties and the mechanical properties such as the stiffness, it is preferably 10 kg/m$^3$ or more and 500 kg/m$^3$ or less, and more preferably 15 kg/m$^3$ or more and 100 kg/m$^3$ or less. The apparent density of the expanded beads molded article is calculated by dividing the weight of the expanded beads molded article by the volume calculated based on dimensions.

EXAMPLES

Hereinafter, the present invention will be described in detail with reference to examples, but the present invention is not limited thereto. Note that for each example and each comparative example performed as follows, the bulk density or the like of the expanded beads were measured, and evaluation of the molded article of polypropylene-based resin expanded beads produced by using the expanded beads was performed. A measurement result and an evaluation result are shown in Table 1. Further, a method for measuring the above bulk density, and a method for performing the above evaluation will be described later. In the tables, the carbon black is described as CB.

Further, the blending ratio of the NOR type hindered amine in the thermoplastic polymer layer of the expanded beads, the blending ratio of the NOR type hindered amine in the expanded beads, and a ratio of the blending ratio of the NOR type hindered amine in the thermoplastic polymer layer to the blending ratio of the NOR type hindered amine in the expanded beads was calculated from the blending ratio of each material used for producing the resin beads and shown in the table. Note that the blending ratio of the carbon black in the thermoplastic polymer layer of the expanded beads and the blending ratio of the carbon black in the expanded beads are also appropriately calculated from the blending ratio of each material used for producing the resin beads.

Example 1

(Preparation of Resin Beads)

A production apparatus equipped with a core layer forming extruder having an inner diameter of 50 mm, a die for forming a multilayer strand attached to the downstream side of the core layer forming extruder, and a covering layer forming extruder having an inner diameter of 30 mm was prepared. Note that in the production apparatus, the downstream side of the covering layer forming extruder is connected to the die for forming the multilayer strand, and the melt-kneaded product for forming each layer can be laminated in the die and co-extrusion can be performed.

As a base material resin constituting the core layer, a propylene-ethylene random copolymer was used. As the above propylene-ethylene random copolymer, a polypropylene-based resin having a melting point (a melting peak temperature) of 153° C. measured based on JIS K7121: 1987 and a melt mass flow rate of 7 g/10 min measured under conditions of 230° C. and a load of 2.16 kg based on JIS K7210-1: 2014 was used. As a core layer molding material constituting the core layer, in addition to the base material resin described above, 0.05 parts by weight of zinc borate as a cell controlling agent was used with respect to 100 parts by weight of the core layer molding material, as well as carbon black (furnace black) and an NOR type hindered amine (manufactured by BASF SE, trade name NOR116 (with a molecular weight of 2261)) were used at a blending ratio shown in Table 1, and these materials were supplied to the core layer forming extruder and melt-kneaded.

As a base material resin constituting the thermoplastic polymer layer, the propylene-ethylene random copolymer was used. As the above propylene-ethylene random copolymer, a polypropylene-based resin having a melting point of 143° C. measured based on JIS K7121: 1987 and a melt mass flow rate of 8 g/10 min measured under conditions of 230° C. and a load of 2.16 kg based on JIS K7210-1: 2014 was used.

As a thermoplastic polymer layer forming material constituting the thermoplastic polymer layer, the carbon black (furnace black) was used at a blending ratio shown in Table 1 in addition to the above base material resin, and these materials were supplied to the thermoplastic polymer layer forming extruder and melt-kneaded.

The melt-kneaded products for forming each layer, which is obtained through melt-kneading as described above was introduced into the die for forming the multilayer strand and merged in the die, and the multilayer strand having a two-layer structure (thermoplastic polymer layer/core layer structure) was extruded from pores of a spinneret attached to the downstream side of the die. The extruded strand was cooled with water and cut with a pelletizer to obtain resin beads having an average weight of 1.6 mg per bead.

(Preparation of Expanded Beads)

The obtained resin beads of 1 kg was supplied into a sealed vessel having a content of 5 L together with 3 L of water as an aqueous dispersion medium. Further, with respect to 100 parts by weight of the resin beads, 0.3 parts by weight of kaolin as the inorganic dispersant and 0.004 parts (as an active ingredient) by weight of a surfactant (trade name: NEOGEN, manufactured by DKS Co. Ltd., sodium dodecylbenzenesulfonate) were added, respectively.

Next, carbon dioxide as a blowing agent was injected into the sealed vessel and pressurized until a gauge pressure reached 2.0 MPa (G). Note that the pressure denoted by (G) is a gauge pressure, that is, a value of a pressure based on the atmospheric pressure. Then, the inside of the sealed vessel was heated to a foaming temperature (162° C.) at a heating rate of 2° C./min with stirring, and maintained at the same temperature for 15 minutes. In this way, adjustment was performed such that a high-temperature peak appeared in an endothermic curve according to DSC measurement of the expanded beads to be obtained.

Then, the contents (resin beads and water) in the sealed vessel were released under the atmospheric pressure to obtain the expanded beads (first-stage expanded beads) having a bulk density of 47 kg/m$^3$.

The first-stage expanded beads obtained as described above were left in an environment of an air temperature of 23° C., a relative humidity of 50%, and 1 atm for 24 hours to be aged. Then, the pressurizable sealed vessel was filled with the first-stage expanded beads after having been aged, and the pressure in the sealed vessel was increased from a normal pressure to pressurize the expanded beads. The state where the expanded beads were pressurized was maintained for a predetermined time period, and cells of the expanded beads were impregnated with air. Then, the first-stage expanded beads were taken out from the sealed vessel to obtain first-stage expanded beads having a pressure in the cell of the expanded beads of 0.5 MPa (G). Then, this first-stage expanded beads were supplied to a second-stage foaming apparatus. Steam was supplied into the apparatus to foam the first-stage expanded beads, thereby obtaining the expanded beads having a bulk density of 23 kg/m$^3$. The expanded beads obtained by the second-stage foaming were used in, for example, the following measurement and the production of the expanded beads molded article.

(Bulk Density of Expanded Beads)

The expanded beads to be measured are left for 24 hours or more in an environment of an air temperature of 23° C., a relative humidity of 50%, and 1 atm to be aged. The expanded beads group (with a weight W of 30 g) after having been aged was filled in a measuring cylinder, and the bottom surface of the measuring cylinder was lightly tapped several times on a floor surface to stabilize the filling height of the expanded beads group in the measuring cylinder. The bulk volume V (L) of the expanded beads group indicated by the scale of the measuring cylinder was read. Then, the weight W of the above expanded beads group was divided by the volume V (W/V). By converting the value thus obtained into kg/m$^3$ through unit conversion, the bulk density (kg/m$^3$) of the expanded beads was calculated.

(Total Heat of Fusion and High-Temperature Peak Heat of Fusion of Expanded Beads)

About 2 mg of the expanded beads were used as a test piece. The test piece was heated and melted according to a plastic transition heat measurement method described in JIS K7122:1987 to obtain a DSC curve at this time. The measurement temperature range was from 23° C. to a temperature of 30° C. higher than the end of the melting peak of the test piece, and the temperature rising rate during heating was 10° C./min.

The DSC curve thus obtained is illustrated in FIG. 4. In the DSC curve, a straight line connecting a point I corresponding to 80° C. on the DSC curve and a point II corresponding to a melting end temperature of the expanded beads was drawn. Note that the melting end temperature is an end point on the high temperature side of a high-temperature peak b, and is an intersection of the high-temperature peak b and a baseline on the higher temperature side than the high-temperature peak b in the DSC curve.

As illustrated in FIG. 4, after a straight line connecting the point I and the point II was drawn, an intersection of a straight line passing through the maximum point III existing between an intrinsic peak a and the high-temperature peak b and parallel to a vertical axis of the graph, and a straight line connecting the point I and the point II was defined as IV.

Then, the area surrounded by a straight line connecting the point I and the point IV, a straight line connecting the point III and the point IV, and a DSC curve connecting the point I and the point III was defined as the area of the intrinsic peak a. Further, the area of a portion (hatched portion) surrounded by a straight line connecting the point IV and the point II, a straight line connecting the point III and the point IV, and a DSC curve connecting the point III and the point II was defined as the area of the high-temperature peak b. The total heat of fusion of the expanded beads was calculated from a sum of the area of the intrinsic peak a and the area of the high-temperature peak b obtained as described above, and the high-temperature peak heat of fusion of the expanded beads was calculated from the area of the high-temperature peak b.

(Production of Expanded Bead Molded Article)

The obtained expanded beads were filled in a pressurizable sealed vessel, and the pressure in the sealed vessel was increased from a normal pressure to pressurize the expanded beads. The state where the expanded beads were pressurized was maintained for a predetermined time period, and cells of the expanded beads were impregnated with air. Then, the expanded beads were taken out from the sealed vessel to obtain expanded beads having a pressure in the cells of the expanded beads of 0.1 MPa (G).

The obtained expanded beads were filled in a mold (metal mold) having a flat plate-shaped molding cavity of length 350 mm×width 200 mm×thickness 50 mm, and heated by the following heating method. In the heating method, steam was supplied to the metal mold to perform preheating (exhaust step) in a state where drain valves provided on both surfaces of the metal mold were opened. Then, steam was supplied from one side of the metal mold for heating, and steam was further supplied from the other side of the metal mold for heating. Subsequently, steam of 0.36 MPa (G) was supplied from both sides of the metal mold and heated. After completion of the heating, and water-cooling was performed until the pressure generated on the molding surface of the metal mold reached 0.04 MPa (G), and then expanded beads molded article was taken out by opening the metal mold. The obtained expanded beads molded article was aged in an oven at 80° C. for 12 hours, and then slowly cooled to a room temperature to obtain a plate-shaped molded article of polypropylene-based resin expanded beads.

Example 2

Resin beads were prepared by the same operation as in Example 1 except that the NOR type hindered amine was added to the thermoplastic polymer layer forming material at a blending ratio shown in Table 1. These resin beads were used to obtain an expanded beads molded article by the same method as in Example 1.

Examples 3 and 4

Resin beads were prepared by the same operation as in Example 1 except that a type of the NOR type hindered amine added to the core layer molding material was changed. These resin beads were used to obtain an expanded beads molded article by the same method as in Example 1. Note that as the NOR type hindered amine, "FP-T80 (trade name, with a molecular weight of 681) manufactured by ADEKA Corporation" was used in Example 3, and "Tinuvin123 (trade name, with a molecular weight of 737) manufactured by BASF SE" was used in Example 4.

Example 5

Resin beads were prepared by the same operation as in Example 1 except that the weight ratio of the thermoplastic polymer layer to the core layer in the resin beads was changed to a value shown in Table 1. These resin beads were used to obtain an expanded beads molded article by the same method as in Example 1.

Example 6

The expanded beads (first-stage expanded beads) were obtained in the same manner as in Example 1. This first-stage expanded beads were used, and two-stage foaming was performed in the same procedure as in Example 1 to have the bulk density shown in Table 1 to prepare the expanded beads having an expansion ratio different from that of Example 1. The expanded beads were used to obtain the expanded beads molded article by the same method as in Example 1.

Example 7

The resin beads were prepared by the same operation as in Example 1 except that the blending ratio of the NOR type hindered amine added to the core layer forming material was changed to a numerical value shown in Table 1. These resin beads were used to obtain an expanded beads molded article by the same method as in Example 1.

In all examples, an expanded beads molded article excellent in fusion-bonding characteristics and flame retardancy was produced. Further, in Examples 3 and 4 in which the NOR type hindered amine having a smaller molecular weight was used, the expanded beads molded article particularly excellent in appearance was produced with unevenness in color tone efficiently suppressed.

Comparative Example 1

Resin beads were prepared by the same operation as in Example 1 except that the thermoplastic polymer layer was not provided, but the resin beads were made to be a single-layer bead with the core layer forming material. These resin beads were used to obtain an expanded beads molded article by the same method as in Example 1.

Since the expanded beads produced in Comparative Example 1 did not have the thermoplastic polymer layer, and the blending ratio of the NOR type hindered amine in the surface layer was high, the expanded beads molded article produced by using the expanded beads was poor in fusion-bonding characteristics.

Comparative Example 2

Resin beads were prepared by the same operation as in Example 1 except that the NOR type hindered amine was added to the thermoplastic polymer layer forming material at a blending ratio shown in Table 1. There resin beads were used to obtain an expanded beads molded article by the same method as in Example 1.

In the obtained expanded beads, since the blending ratio of the NOR type hindered amine in the thermoplastic polymer layer was high, the expanded beads molded article produced by using the expanded beads was poor in fusion-bonding characteristics.

<Evaluation of Molded Article>

Apparent Density of Expanded Beads Molded Article:

A value obtained by dividing the weight of the expanded beads molded article by the volume calculated based on the dimensions was defined as the apparent density ($kg/m^3$) of the expanded beads molded article.

Fusion-Bonding Characteristics:

The fusion-bonding characteristics of the expanded beads molded article was determined based on the ratio of the number of the expanded beads of which the material was broken among the expanded beads exposed on a fracture surface when the expanded beads molded article was broken. Specifically, first, a test piece (length 100 mm×width 100 mm×thickness: the thickness of the molded article) was cut out from the expanded beads molded article, a cut of about 5 mm was made in a thickness direction of each test piece with a cutter knife, and then the test piece was fractured from the cut portion. Next, a number (n) of the expanded beads present on the fracture surface of the expanded beads molded article and a number (b) of the expanded beads of which the material was broken were measured, and a ratio (b/n) of (b) to (n) was expressed as a percentage to be a fusion-bonding ratio (%) and evaluated as follows.

○ (Good): The fusion-bonding ratio is 80% or more.

Δ (Normal): The fusion-bonding ratio is less than 80% and 40% or more.

× (Bad): The fusion-bonding ratio is less than 40%.

Flammability:

The flame retardancy of the expanded beads molded article was evaluated by a method in accordance with a flammability test method defined in the FMVSS No. 302. Specifically, first, the expanded beads molded article was cut to prepare a test body that has a plate shape of 102 mm in width, and 12.7 mm in thickness, and has one of surfaces surrounded by a length side of 350 mm and a width side of 102 mm being a skin surface. In this test body, a start line was drawn at a position 38 mm away from the base end in the length direction, and an end line was drawn at a position 292 mm away from the base end. This test body was used to perform a flammability test by the same method as in the FMVSS No. 302 with the skin surface in contact with flame of a burner. Then, evaluation was performed as follows.

⊙ (Very Good): Self-extinguishing property was shown.
○ Good: The combustion speed was less than 80 mm/min.
x (Bad): The combustion speed was 80 mm/min or more.

Unevenness in Color Tone (Appearance):

Thirty measurement positions were randomly set from the plate surface of the expanded beads molded article. The color tone at these measurement positions was measured by using a spectrophotometer ("CM-5", manufactured by Konica Minolta Japan, Inc.) to acquire a color coordinate in the CIE 1976 L*a*b* color space. Note that the color tone was acquired by reflection measurement, a measurement diameter was φ8 mm, and the measurement method was an SCE method.

The difference between the maximum value and the minimum value of the L* value in the color coordinate obtained at the 30 measurement positions described before was evaluated in accordance with the following criteria.

Note that since all of the expanded beads molded articles in respective comparative examples were poor in one of fusion-bonding characteristics and surface properties, the unevenness in color tone was not evaluated.

⊙ (Very Good): The difference between the maximum value and the minimum value of the L* value is less than 5
○ (Normal): The difference between the maximum value and the minimum value of the L* value is 5 or more

TABLE 1

| | | | Example 1 | Example 2 | Example 3 | Example 4 | Example 5 | Example 6 | Example 7 | Comparative Example 1 | Comparative Example 2 |
|---|---|---|---|---|---|---|---|---|---|---|---|
| Resin beads | Core layer | Melting point of base material resin (° C.) | 153 | 153 | 153 | 153 | 153 | 153 | 153 | 153 | 153 |
| | | Hindered amine Type | NOR116 NOR type | NOR116 NOR type | FP-T80 NOR type | Tinuvin123 NOR type | NOR116 NOR type | NOR116 NOR type | NOR116 NOR type | NOR116 NOR type | NOR116 NOR type |
| | | Blending ratio (wt %) | 0.3 | 0.3 | 0.3 | 0.3 | 0.3 | 0.3 | 0.1 | 0.3 | 0.3 |
| | | CB Blending ratio (wt %) | 3.1 | 3.1 | 3.1 | 3.1 | 3.1 | 3.1 | 3.1 | 3.1 | 3.1 |
| | Thermoplastic polymer layer | Melting point of base material resin (° C.) | 143 | 143 | 143 | 143 | 143 | 143 | 143 | — | 143 |
| | | Hindered amine Type | — | NOR116 NOR type | — | — | — | — | — | — | NOR116 NOR type |
| | | Blending ratio (wt %) | 0 | 0.1 | 0 | 0 | 0 | 0 | 0 | — | 1 |
| | | CB Blending ratio (wt %) | 3.1 | 3.1 | 3.1 | 3.1 | 3.1 | 3.1 | 3.1 | — | 3.1 |
| | | Core layer (wt %)/Thermoplastic polymer layer (wt %) | 95/5 | 95/5 | 95/5 | 95/5 | 98/2 | 95/5 | 95/5 | — (Single layer) | 95/5 |
| Expanded beads | | Bulk density (kg/m$^3$) | 23 | 23 | 23 | 23 | 23 | 18 | 23 | 23 | 23 |
| | | Total heat of fusion (J/g) | 90 | 90 | 90 | 90 | 90 | 90 | 90 | 90 | 90 |
| | | High-temperature peak heat of fusion (J/g) | 20 | 20 | 20 | 20 | 20 | 20 | 20 | 20 | 20 |
| | | Blending ratio of hindered amine in thermoplastic polymer layer (wt %) | 0 | 0.10 | 0 | 0 | 0 | 0 | 0 | 0.30 | 1.00 |
| | | Blending ratio of NOR type hindered amine in expanded beads (wt %) | 0.29 | 0.29 | 0.29 | 0.29 | 0.29 | 0.29 | 0.10 | 0.30 | 0.34 |
| | | Ratio of blending ratio of NOR type hindered amine in thermoplastic polymer layer to blending ratio of NOR type hindered amine in expanded beads | 0 | 0.34 | 0 | 0 | 0 | 0 | 0 | 1.0 | 3.0 |
| Evaluation of molded article | | Apparent density (kg/m$^3$) | 25 | 25 | 25 | 25 | 25 | 20 | 25 | 25 | 25 |
| | | Fusion-bonding characteristics | ○ | ○ | ○ | ○ | ○ | ○ | ○ | x | x |

TABLE 1-continued

|  | Example 1 | Example 2 | Example 3 | Example 4 | Example 5 | Example 6 | Example 7 | Comparative Example 1 | Comparative Example 2 |
|---|---|---|---|---|---|---|---|---|---|
| Flame retardancy (FMVSS) | ◎ | ◎ | ◎ | ◎ | ◎ | ◎ | ◎ | ◎ | ◎ |
| Unevenness in color tone (appearance) | ○ | ○ | ◎ | ◎ | ○ | ○ | ○ | — | — |

The above embodiment includes the following technical ideas.

(1) Polypropylene-based resin expanded beads including an NOR type hindered amine, wherein
the polypropylene-based resin expanded beads have a surface on which a thermoplastic polymer layer is located,
a blending ratio of the NOR type hindered amine in the polypropylene-based resin expanded beads is 0.03 wt % or more and 0.5 wt % or less, and
a blending ratio of the NOR type hindered amine in the thermoplastic polymer layer is less than the blending ratio of the NOR type hindered amine in the expanded beads.

(2) The polypropylene-based resin expanded beads according to the above (1), wherein the blending ratio of the NOR type hindered amine in the thermoplastic polymer layer is 0.2 wt % or less (including 0).

(3) The polypropylene-based resin expanded beads according to the above (1) or (2), wherein the ratio of the thermoplastic polymer layer in the polypropylene-based expanded beads is 0.5 wt % or more and 10 wt % or less.

(4) The polypropylene-based resin expanded beads according to any one of the above (1) to (3), wherein the polypropylene-based resin expanded beads have a bulk density of 10 kg/m$^3$ or more and 500 kg/m$^3$ or less.

(5) A method for producing a polypropylene-based resin expanded beads, including:
a covering step of covering a core layer including a polypropylene-based resin as a base material resin and an NOR type hindered amine with a thermoplastic polymer layer; and
a foaming step of foaming resin beads having the core layer and the thermoplastic polymer layer obtained by the covering step to obtain the polypropylene-based resin expanded beads, wherein
in the resin beads, a blending ratio of the NOR type hindered amine in the resin beads is 0.03 wt % or more and 0.5 wt % or less, and a blending ratio of the NOR type hindered amine in the thermoplastic polymer layer is less than the blending ratio of the NOR type hindered amine in the resin beads (including 0).

REFERENCE SIGNS LIST

10 Resin beads
11 Core layer
12 Thermoplastic polymer layer
20 Polypropylene-based resin expanded beads
22 Thermoplastic polymer layer
30, 30A, 30B Surface layer
101 Resin beads body
102 Expanded beads body

The invention claimed is:

1. Polypropylene-based resin expanded beads including an NOR type hindered amine that achieves an expanded beads molded article with a fusion-bonding ratio of 40% or more, wherein the polypropylene-based resin expanded beads have an expanded beads body including a polypropylene-based resin as a base material resin, and a thermoplastic polymer layer covering the expanded beads body,
the polypropylene-based resin expanded beads have a surface on which the thermoplastic polymer layer is located,
a blending ratio of the NOR type hindered amine in the polypropylene-based resin expanded beads is 0.03 wt % or more and 0.5 wt % or less,
a base material resin constituting the thermoplastic polymer layer is a polyolefin-based resin,
a melting point or a softening point of the polyolefin-based resin is lower than a melting point of the polypropylene-based resin,
a ratio of the thermoplastic polymer layer in the polypropylene-based resin expanded beads is 0.5 wt % or more and 10 wt % or less, and
a blending ratio of the NOR type hindered amine in the thermoplastic polymer layer is less than the blending ratio of the NOR type hindered amine in the polypropylene-based resin expanded beads (including 0).

2. The polypropylene-based resin expanded beads according to claim 1, wherein the melting point of the polyolefin-based resin is 100° C. or higher and 150° C. or lower.

3. The polypropylene-based resin expanded beads according to claim 1, wherein a difference between the melting point of the polypropylene-based resin and the melting point of the polyolefin-based resin is 3° C. or higher and 30° C. or lower.

4. The polypropylene-based resin expanded beads according to claim 1, wherein the blending ratio of the NOR type hindered amine in the thermoplastic polymer layer is 0.2 wt % or less (including 0).

5. The polypropylene-based resin expanded beads according to claim 1, wherein
the polypropylene-based resin expanded beads include carbon black,
a blending ratio of the carbon black in the polypropylene-based resin expanded beads is 0.5 wt % or more and 5 wt % or less, and
a blending ratio of the carbon black in the thermoplastic polymer layer is 0.5 wt % or more and 5.0 wt % or less.

6. The polypropylene-based resin expanded beads according to claim 1, wherein the blending ratio of the NOR type hindered amine in the thermoplastic polymer layer is 0.01 wt % or more.

7. The polypropylene-based resin expanded beads according to claim 1, wherein the polypropylene-based resin expanded beads have a bulk density of 10 kg/m$^3$ or more and 500 kg/m$^3$ or less.

8. A method for producing polypropylene-based resin expanded beads that achieves an expanded beads molded article with a fusion-bonding ratio of 40% or more, comprising:
- a covering step of covering a core layer including a polypropylene-based resin as a base material resin and an NOR type hindered amine with a thermoplastic polymer layer; and
- a foaming step of foaming resin beads having the core layer and the thermoplastic polymer layer obtained by the covering step to obtain the polypropylene-based resin expanded beads, wherein
- a base material resin constituting the thermoplastic polymer layer is a polyolefin-based resin,
- a melting point or a softening point of the polyolefin-based resin is lower than a melting point of the polypropylene-based resin, and
- a blending ratio of the NOR type hindered amine in the polypropylene-based resin expanded beads is 0.03 wt % or more and 0.5 wt % or less, a ratio of the thermoplastic polymer layer in the polypropylene-based resin expanded beads is 0.5 wt % or more and 10 wt % or less, and a blending ratio of the NOR type hindered amine in the thermoplastic polymer layer is less than the blending ratio of the NOR type hindered amine in the polypropylene-based resin expanded beads (including 0).

9. The polypropylene-based resin expanded beads according to claim 1, wherein
- the blending ratio of the NOR type hindered amine in the polypropylene-based resin expanded beads is 0.06 wt % or more and 0.5 wt % or less, and
- the blending ratio of the NOR type hindered amine in the thermoplastic polymer layer is 0.05 wt % or less (including 0).

10. The method for producing polypropylene-based resin expanded beads according to claim 8, wherein
- the blending ratio of the NOR type hindered amine in the resin beads is 0.06 wt % or more and 0.5 wt % or less, and
- the blending ratio of the NOR type hindered amine in the thermoplastic polymer layer is 0.05 wt % or less (including 0).

* * * * *